United States Patent
Zhou et al.

(10) Patent No.: US 11,318,604 B2
(45) Date of Patent: May 3, 2022

(54) DRIVING ARM WITH MULTIPLE DEGREES OF FREEDOM AND TWIN-ARMED ROBOT USING SAME

(71) Applicant: GUANGDONG INSTITUTE OF INTELLIGENT MANUFACTURING, Guangdong (CN)

(72) Inventors: Xuefeng Zhou, Guangdong (CN); Zhihao Xu, Guangdong (CN); Hongmin Wu, Guangdong (CN); Shuai Li, Guangdong (CN); Guanrong Tang, Guangdong (CN); Kaige Li, Guangdong (CN); Taobo Cheng, Guangdong (CN); Dan Huang, Guangdong (CN)

(73) Assignee: GUANGDONG INSTITUTE OF INTELLIGENT MANUFACTURING, Guangdong (CN)

( * ) Notice: Subject to any disclaimer, the term of this patent is extended or adjusted under 35 U.S.C. 154(b) by 304 days.

(21) Appl. No.: 16/494,610

(22) PCT Filed: Feb. 28, 2018

(86) PCT No.: PCT/CN2018/077579
§ 371 (c)(1),
(2) Date: Feb. 11, 2020

(87) PCT Pub. No.: WO2018/166349
PCT Pub. Date: Sep. 20, 2018

(65) Prior Publication Data
US 2020/0206907 A1  Jul. 2, 2020

(30) Foreign Application Priority Data

Mar. 16, 2017  (CN) .......................... 201710157220.9

(51) Int. Cl.
*B25J 9/06* (2006.01)
*B25J 9/00* (2006.01)
(Continued)

(52) U.S. Cl.
CPC ............... *B25J 9/0087* (2013.01); *B25J 9/04* (2013.01); *B25J 9/06* (2013.01); *B25J 9/08* (2013.01);
(Continued)

(58) Field of Classification Search
CPC ..... B25J 9/0087; B25J 9/04; B25J 9/06; B25J 9/08; B25J 9/1025; B25J 9/104;
(Continued)

(56) References Cited

U.S. PATENT DOCUMENTS

| 4,828,453 A | 5/1989 | Martin et al. |
| 5,765,443 A * | 6/1998 | Murase ................ B25J 17/0258 74/490.05 |

(Continued)

FOREIGN PATENT DOCUMENTS

| CN | 202146362 | 2/2012 |
| CN | 104602868 | 5/2015 |

(Continued)

OTHER PUBLICATIONS

International Search Report for PCT/CN2018/077579, dated May 4, 2018, including English translation,8 pages total.

*Primary Examiner* — Dale Moyer
(74) *Attorney, Agent, or Firm* — Adsero IP

(57) ABSTRACT

The present disclosure discloses a multi-degree-of-freedom driving arm and a dual-arm robot using the arm, the multi-degree-of-freedom driving arm comprises a single-degree-of-freedom driving module and a plurality of dual-degree-of-freedom driving modules, and the single-degree-of-freedom driving module and the dual-degree-of-freedom (Continued)

driving module located at the innermost side are coupled to each other; the dual-degree-of-freedom driving module has two orthogonal rotational degrees of freedom, and comprises a first driving mechanism that is configured to drive the dual-degree-of-freedom driving module to rotate in the first rotational degree of freedom, and a second driving mechanism that is configured to drive the dual-degree-of-freedom driving module to rotate in the second rotational degree of freedom; the first driving mechanism of the dual-degree-of-freedom driving module located on outer side is disposed on the second driving mechanism of the dual-degree-of-freedom driving module adjacent thereto and located on inner side. The robot has seven degrees of freedom for each arm, so that it is flexible and suitable for performing various complicated tasks; the robot has low cost and compact structure, and the energy density of the self-structure per unit volume is maximized; the arm has a modular structure that ensures excellent interchangeability and saves on maintenance costs.

7 Claims, 17 Drawing Sheets

(51) Int. Cl.
| | | |
|---|---|---|
| *B25J 9/04* | (2006.01) | |
| *B25J 9/08* | (2006.01) | |
| *B25J 9/10* | (2006.01) | |
| *B25J 9/12* | (2006.01) | |
| *B25J 15/00* | (2006.01) | |
| *B25J 19/00* | (2006.01) | |

(52) U.S. Cl.
CPC .............. *B25J 9/104* (2013.01); *B25J 9/1025* (2013.01); *B25J 9/12* (2013.01); *B25J 15/0028* (2013.01); *B25J 19/0004* (2013.01)

(58) Field of Classification Search
CPC ...... B25J 9/12; B25J 15/0009; B25J 15/0028; B25J 17/0258; B25J 19/0004; B25J 19/0029
See application file for complete search history.

(56) References Cited

U.S. PATENT DOCUMENTS

| | | | |
|---|---|---|---|
| 2013/0343640 A1 | 12/2013 | Buehler et al. | |
| 2014/0222198 A1* | 8/2014 | Emami | ................ B25J 9/08 700/250 |
| 2015/0104283 A1* | 4/2015 | Nogami | ................ B25J 9/06 414/730 |
| 2015/0290817 A1* | 10/2015 | Goldenberg | ............ B25J 18/02 74/490.02 |
| 2018/0009111 A1 | 1/2018 | Ho et al. | |
| 2019/0240832 A1* | 8/2019 | Kawaguchi | ............ F16H 21/46 |

FOREIGN PATENT DOCUMENTS

| | | |
|---|---|---|
| CN | 205521390 | 8/2016 |
| CN | 106078710 | 11/2016 |
| CN | 106826790 | 6/2017 |
| CN | 106945031 | 7/2017 |
| CN | 107042507 | 8/2017 |
| WO | 2018166349 | 9/2018 |

\* cited by examiner

DRIVING ARM WITH MULTIPLE DEGREES OF FREEDOM AND TWIN-ARMED ROBOT USING SAME

CROSS-REFERENCE TO RELATED APPLICATION

This application claims priority to and is a 35 U.S.C. § 371 national phase application of PCT/CN2018/077579 (WO 2018/166349), filed on Feb. 28, 2018 entitled "DRIVING ARM WITH MULTIPLE DEGREES OF FREEDOM AND TWIN-ARMED ROBOT USING SAME", which application claims priority to and the benefit of Chinese Application CN 201710157220.9 filed Mar. 16, 2017; the disclosures of which are incorporated herein by reference in their entirety.

TECHNICAL FILED

The present disclosure relates to the technical field of industrial robots, more particularly, to a multi-degree-of-freedom driving arm and a dual-arm robot using the arm.

BACKGROUND

The research on dual-arm robots began in the 1990s and is mainly applied to space station operating robots and humanoid robots, such as the Justin-robot developed by DLR (German Aerospace Center), the Robonaut 2 robot developed by NASA (National Aeronautics and Space Administration) of the United States, and ASIMO humanoid robots developed by Honda Corporation of Japan, etc. The main research contents include a motion trajectory planning of dual-arm, a dual-arm coordination control algorithm and a control of the operating force/moment of force, etc.

In the industrial application field, with a variety of special machines, SCARA robots and DELTA robots have realized the manufacture of parts including casings, glass and cover plates; the processes and equipments are quite mature and have a high level of automation. At present, in the 3C industry, the only one process that is far from automation is the final assembly. For example, there are a large number of FPC (Flexible Circuit Board) assembling works in 3C products, and in order to quickly and accurately perform the FPC board assembling, it is required to make breakthroughs and comprehensive design on 3C intelligent assembling claws, rapid visual positioning with the robot and precise control technology of the robot gripping force, which has a large overall technical difficulty, and the traditional robot systems are difficult to meet the above requirements. With the improvement of the automation level of modern manufacturing, Yaskawa Electric Corporation was the first to launch an industrial dual-arm robot SDA-10 in 2008, which realized that one controller simultaneously controlled two operating arms to complete some simple coordinated operation tasks. In 2014, ABB Ltd. launched a dual-arm robot prototype YuMi, which has high sensitivity and the extremely flexible dual-arm, and can be used for a variety of tasks requiring high precision. In addition, the humanized visual and tactile functions can not only coordinate with the machine, but also achieve perfect human-machine collaboration. At present, dual-arm robots are developing in the direction of high speed, high precision and high intelligence.

When a plurality of existing single-arm robots work in coordination, the space occupied by the whole system is large, which may waste space, and it is difficult to change or adjust the production line after the installation position is fixed; and for the existing dual-arm robot, the motor and reducer used are both customized and designed in one piece, so the cost is very high.

SUMMARY

An object of the present disclosure is to overcome the deficiencies of the prior art described above and to provide a multi-degree-of-freedom driving arm and a dual-arm robot using the arm.

The present invention is achieved by the following technical solutions: a multi-degree-of-freedom driving arm, including a single-degree-of-freedom driving module located on an inner side and a plurality of dual-degree-of-freedom driving modules disposed on an outer side and sequentially connected to each other from the inner side to the outer side, and the single-degree-of-freedom driving module is connected to the dual-degree-of-freedom driving module located on the innermost side, and the dual-degree-of-freedom driving module has two orthogonal rotational degrees of freedom that are respectively a first rotational degree of freedom and a second rotational degree of freedom, and comprises a first driving mechanism that is configured to drive the dual-degree-of-freedom driving module to rotate in the first rotational degree of freedom, and a second driving mechanism that is configured to drive the dual-degree-of-freedom driving module to rotate in the second rotational degree of freedom; the first driving mechanism of the dual-degree-of-freedom driving module located on the outer side is disposed on the second driving mechanism of the dual-degree-of-freedom driving module adjacent thereto and located on the inner side.

The single-degree-of-freedom driving module is combined with several dual-degree-of-freedom driving modules, so that the robot arm becomes a multi-degree-of-freedom driving arm, which is more flexible, changeable, and adaptable, and can reduce the dependence on the tooling and the fixture, and is suitable for complicated tasks such as assembling work, etc.

The dual-degree-of-freedom driving module includes a triangular bracket separated by a diaphragm to form a first space and a second space, a first casing disposed on the triangular bracket and configured to seal the first space and the second space, and a right angle bracket; the first driving mechanism includes a first motor bracket fixed in the first space, a first servo motor fixed on the first motor bracket, a first motor controller configured to drive the first servo motor, a first synchronous wheel coupled to a driving shaft of the first servo motor and driven by the first servo motor, a bevel gear support bracket fixed in the first space, a second synchronous wheel, a first bevel gear, a second bevel gear, a first harmonic reducer, a first position-limiting plate, a first positioning plate and a first conduit fixing bracket through which a conduit passes; the second synchronous wheel and the first bevel gear are coupled to each other via a shaft, as a whole, and integrally coupled to the bevel gear support bracket via a bearing, and the second synchronous wheel and the first bevel gear are respectively located on two sides of the bevel gear support bracket; the first synchronous wheel is coupled to the second synchronous wheel via a first synchronous belt; the second bevel gear is located in the first space, the first harmonic reducer and the first position-limiting plate are both located in the second space, and the first bevel gear and the second bevel gear are arranged to be engaged and connected at a right angle; the second bevel gear is fixedly connected with an input end of the first harmonic reducer, the first conduit fixing bracket is fixed on a center of the first positioning plate, the first position-limiting plate is fixed on an output end of the first harmonic reducer, and the first conduit fixing bracket sequentially passes through a through hole in a center of the first position-limiting plate, the first harmonic reducer, and the second bevel gear; the triangular bracket is provided with a first mounting hole, and an end of the first harmonic reducer where the input end is located is fixedly mounted on a diaphragm of the triangular bracket around the first mounting hole; the horizontal plane of the right angle bracket is provided with a second mounting hole, an end of the first harmonic reducer where the output end is located passes through the second mounting hole, and a diaphragm of the right angle bracket is clamped and fixed between the first harmonic reducer and the first position-limiting plate. The first motor controller drives the first servo motor to drive the first synchronous wheel and the second synchronous wheel to rotate, thereby driving the first bevel gear and the second bevel gear engaged therewith to rotate, and under the action of the first harmonic reducer and the first position-limiting plate, the clamped right angle bracket rotates around the axis of the second bevel gear and the first harmonic reducer, thereby realizing a rotation in one degree of freedom.

The second driving mechanism includes a second motor bracket fixed in the first space, a second servo motor fixed on the second motor bracket, a second motor controller configured to drive the second servo motor, a third synchronous wheel driven by the rotating shaft of the second servo motor, a fourth synchronous wheel, a second harmonic reducer fixed coaxially with the fourth synchronous wheel, a second position-limiting plate, a second positioning plate and a second conduit fixing bracket through which the conduit passes; the third synchronous wheel is coupled to the fourth synchronous wheel via a second synchronous belt; a side surface of the triangular bracket is provided with a third mounting hole through which the rotating shaft of the fourth synchronous wheel passes, the rotating shaft of the fourth synchronous wheel is fixedly connected with the input end of the second harmonic reducer, an end of the second harmonic reducer where an input end is located is fixedly mounted on the side surface of the triangular bracket around the third mounting hole in the dual-degree-of-freedom driving module adjacent thereto, the second conduit fixing bracket is fixed on the center of the second positioning plate, the second position-limiting plate is fixed on an output end of the second harmonic reducer, the second conduit fixing bracket sequentially passes through a through hole in a center of the second position-limiting plate, the second harmonic reducer, and the fourth bevel gear, and clamps the side surface of the triangular bracket between the second harmonic reducer and the second positioning plate. The second motor controller drives the second servo motor to drive the third synchronous wheel and the fourth synchronous wheel to rotate, and under the action of the second harmonic reducer and the second position-limiting plate, the dual-degree-of-freedom driving module rotates around the axis of the fourth bevel gear and the second harmonic reducer, thereby realizing a rotation in another degree of freedom.

The side surface of the triangular bracket located between adjacent dual-degree-of-freedom driving modules is provided with a second casing configured to cover the second harmonic reducer.

The single-degree-of-freedom driving module includes a first mounting plate, a second mounting plate mounted perpendicularly to the first mounting plate, a third motor bracket disposed on the first mounting plate, a third servo motor fixed on the third motor bracket, a fifth synchronous wheel connected to the driving shaft of the third servo motor and driven by the third servo motor, a sixth synchronous wheel, a third harmonic reducer fixed coaxially with the sixth synchronous wheel, and a third position-limiting plate, a third positioning plate and a third conduit fixing bracket through which the conduit passes; the fifth synchronous wheel is coupled to the sixth synchronous wheel via a third synchronous belt; the rotating shaft of the six synchronous wheel is fixedly connected with an input end of the third harmonic reducer, and the second mounting plate is clamped between the sixth synchronous wheel and the third harmonic reducer, an end of the third harmonic reducer where an input end is located is fixedly mounted on the second mounting plate; the end of the third harmonic reducer where the input end is located is fixedly mounted on the side surface of the triangular bracket around the third mounting hole in the dual-degree-of-freedom driving module adjacent thereto; the third conduit fixing bracket is fixed on the center of the third positioning plate, the third position-limiting plate is fixed on an output end of the third harmonic reducer, and the third conduit fixing bracket sequentially passes through the side surface of the triangular bracket in the dual-degree-of-freedom driving module adjacent to the single-degree-of-freedom driving module, a through hole in a center of the third position-limiting plate, the third harmonic reducer, and the sixth synchronous wheel, and clamps the side surface of the triangular bracket between the third harmonic reducer and the third positioning plate. The third servo motor drives the fifth synchronous wheel and the sixth synchronous wheel, and under the action of the third harmonic reducer and the third position-limiting plate, the dual-degree-of-freedom driving module adjacent and connected to the single-degree-of-freedom driving module is driven to rotates around the axis of the sixth synchronous wheel and the third harmonic reducer, thereby realizing the rotation of the dual-degree-of-freedom driving module in one degree of freedom.

The first position-limiting plate is cut out inward partially at its periphery to form a missing portion and a convex portion which are spaced apart from each other, the diaphragm at the periphery of the first harmonic reducer is provided with three first sensors that are distributed with intervals of 45 degrees, and when the first position-limiting plate rotates with the second bevel gear, the first sensor is aligned with the missing position or the convex position of the first position-limiting plate; the structures of the second position-limiting plate and the third position-limiting plate are consistent with the structure of the first position-limiting plate; the side surface of the triangular bracket on the periphery of the second harmonic reducer is provided with three second sensors that are distributed with intervals of 45 degrees, and when the second position-limiting plate rotates with the fourth synchronous wheel, the second sensor is aligned with a missing position or a convex position of the second position-limiting plate; The second mounting plate on the periphery of the third harmonic reducer is provided with three third sensors that are distributed with intervals of 45 degrees, and when the third position-limiting plate rotates with the sixth synchronous wheel, the third sensor is aligned with a missing position or a convex position of the third position-limiting plate.

It is provided with three dual-degree-of-freedom driving modules. The three dual-degree-of-freedom driving modules are combined with one single-degree-of-freedom driving module to form a robot arm with seven degrees of freedom for each arm, which makes the arm more flexible.

The dual-arm robot includes a base, two sets of multi-degree-of-freedom driving arms disposed on the base, and a fixture disposed on an outer end of the multi-degree-of-freedom driving arm; Each set of multi-degree-of-freedom driving arm includes three dual-degree-of-freedom driving modules that are sequentially connected to each other from the inner side to the outer side, and the dual-degree-of-freedom driving module located on the inner side is connected with a single-degree-of-freedom driving module connected to the base, and the fixture is connected to the dual-degree-of-freedom driving module located on the outer side; all ends of the first servo motor are provided with a relative encoder and a band brake that are configured to control the first sensor and the position limiting information of the first position-limiting plate, and the dual-arm robot is provided with a processing module configured to receive and process the feedback information transmitted from the relative encoder; the relative encoder and the band brake used in the ends of the second servo motor and the third servo motor have the same structures as those used in the first servo motor.

Compared with the prior art, the present disclosure has the following advantages: the robot according to the present disclosure has seven degrees of freedom for each arm, so that it is flexible and suitable for performing complicated tasks such as assembling work; the robot according to the present disclosure has low cost and compact structure, and the energy density of the self-structure per unit volume is maximized; the arm has a modular structure that ensures excellent interchangeability and saves on maintenance costs.

Figure 1:
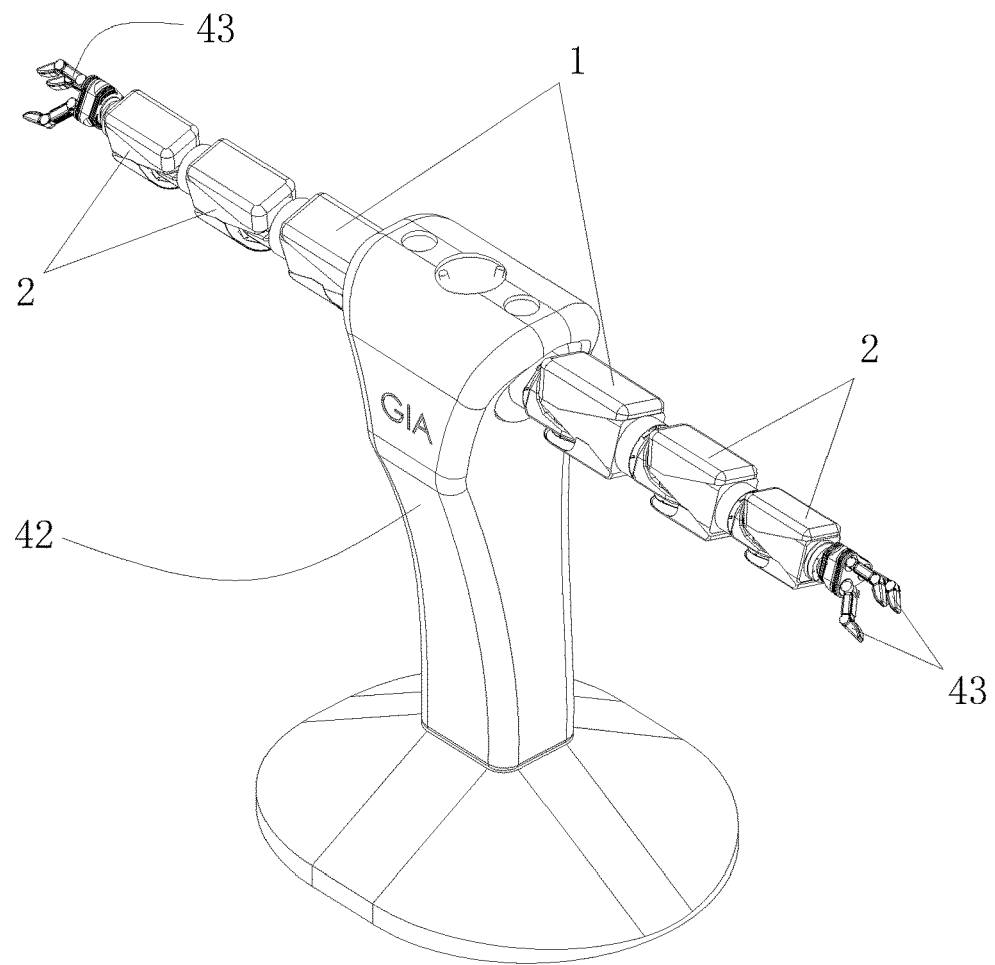
FIG. 1 is a perspective view illustrating an embodiment of the present disclosure.
Figure 2:
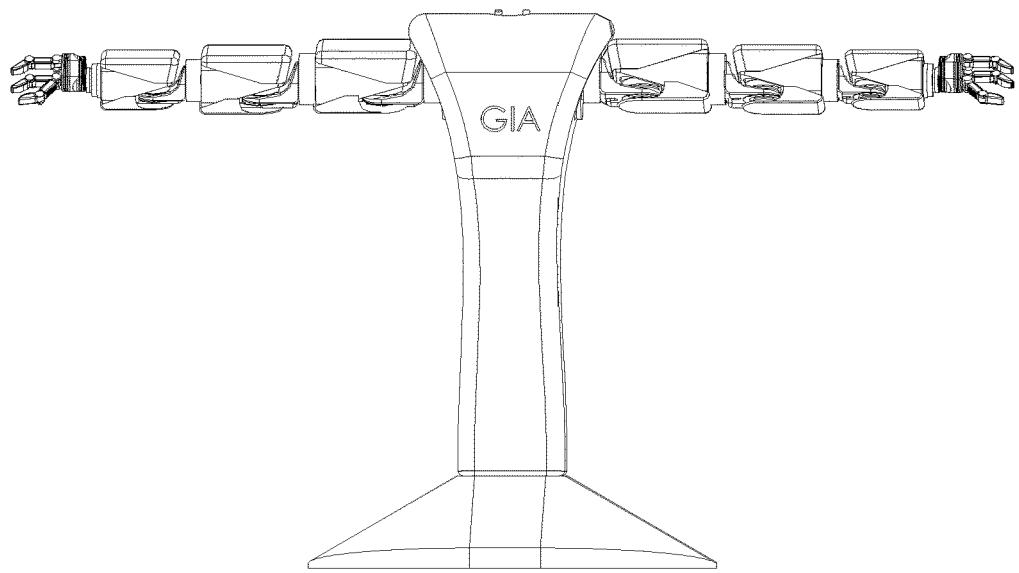
FIG. 2 is a front view illustrating an embodiment of the present disclosure.
Figure 3:
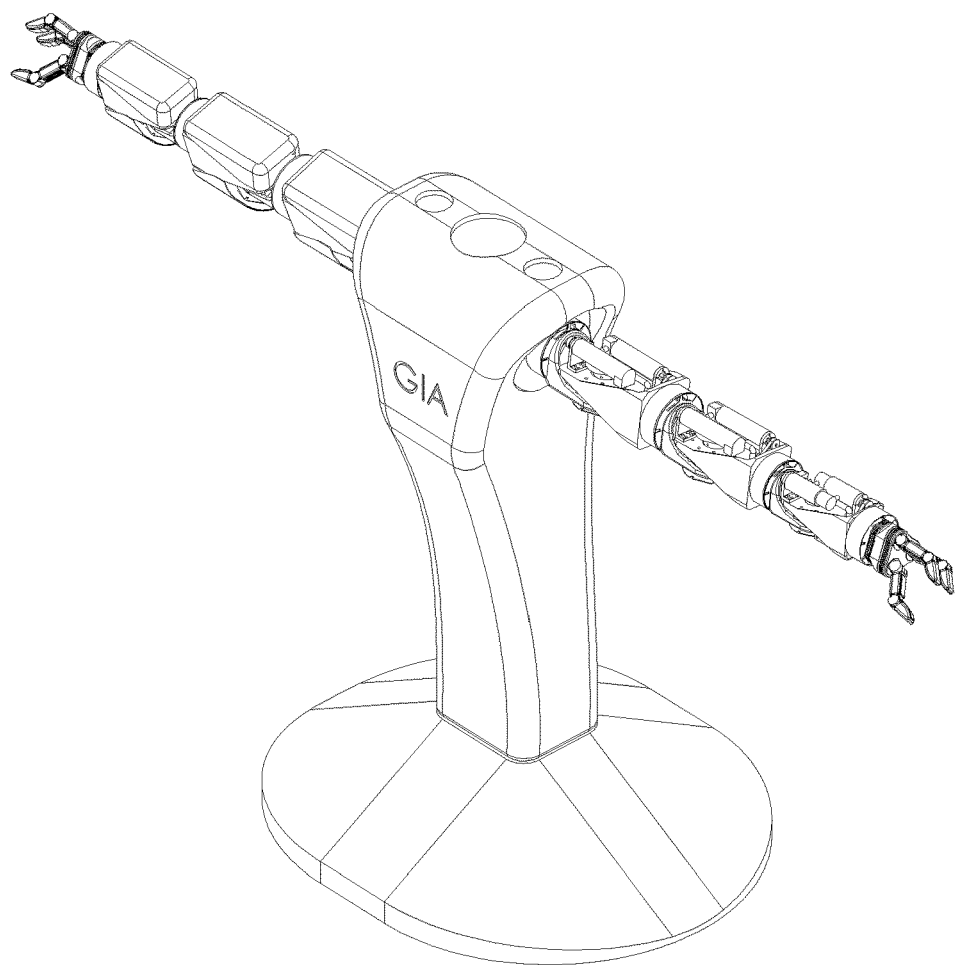
FIG. 3 is a perspective view illustrating a single-sided arm with the first casing removed according to an embodiment of the present disclosure.
Figure 4:
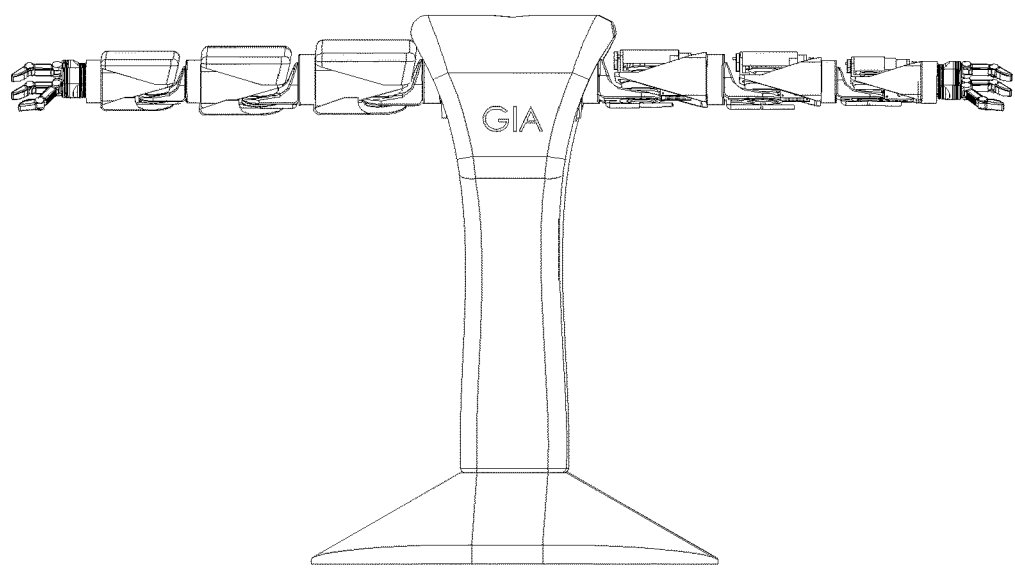
FIG. 4 is a front view illustrating a single-sided arm with the first casing removed according to an embodiment of the present disclosure.
Figure 5:
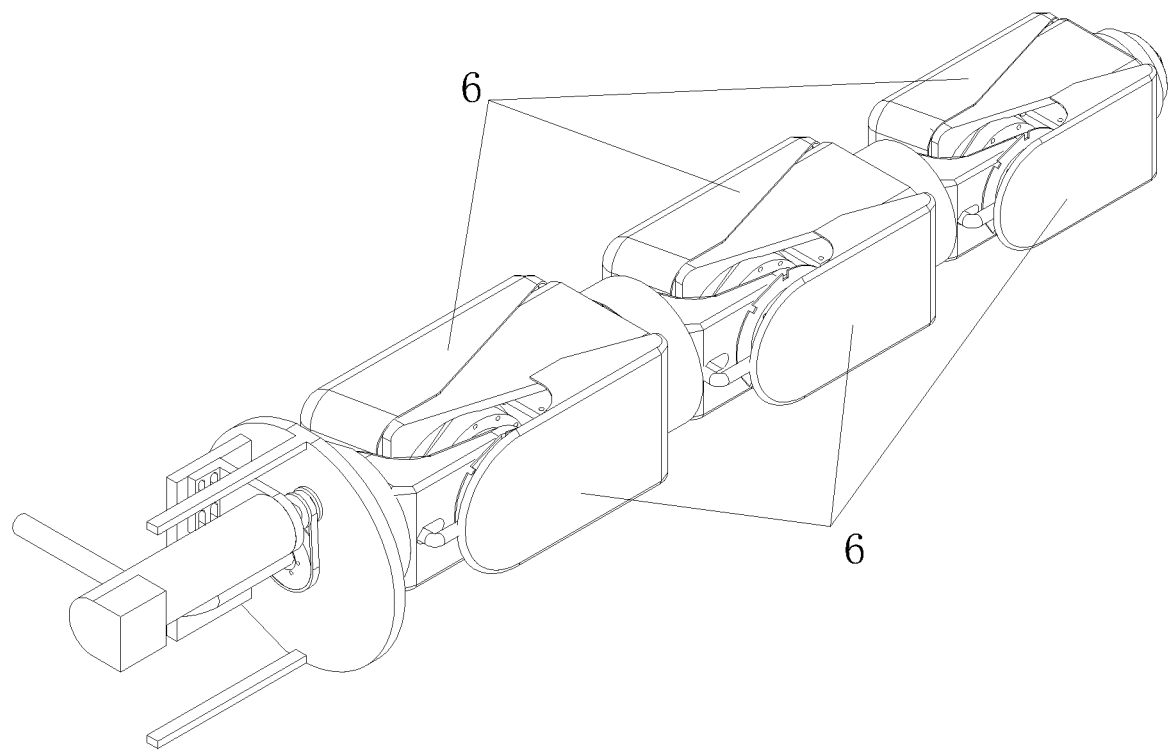
FIG. 5 is a structural schematic view illustrating a single arm with seven degrees of freedom according to an embodiment of the present disclosure.
Figure 6:
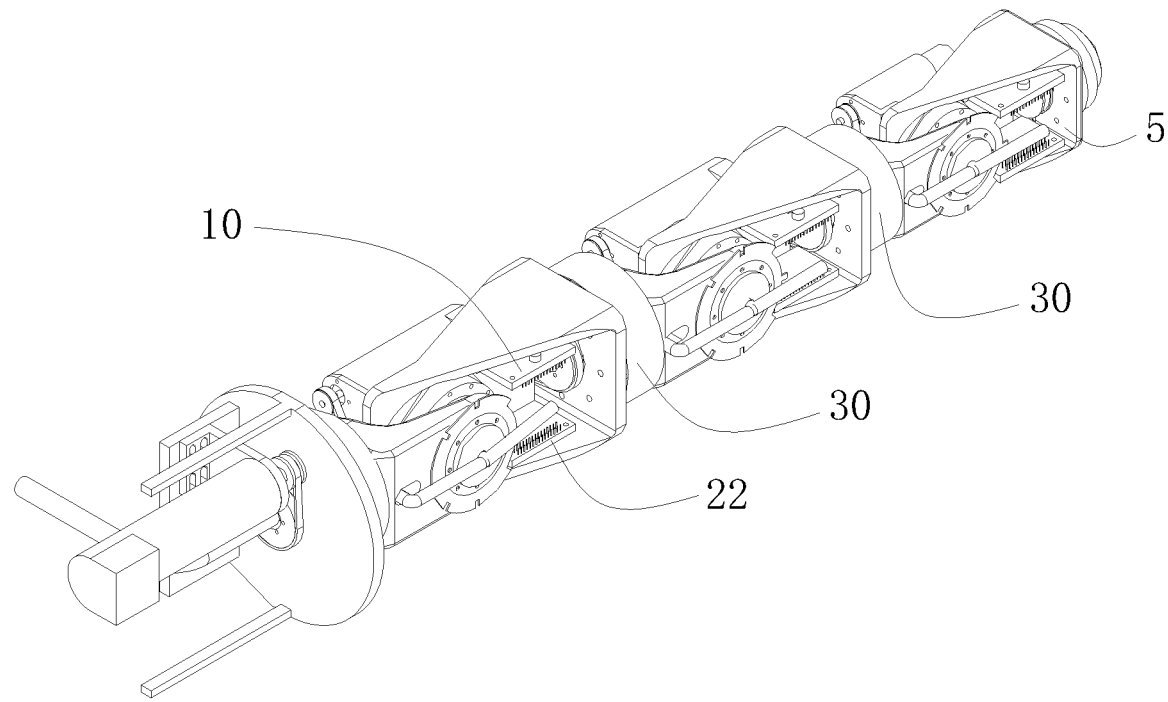
FIG. 6 is a structural schematic view illustrating the interior of a single arm with seven degrees of freedom according to an embodiment of the present disclosure.

Wherein, the meanings represented by the reference numerals in the figures are:

1. Single-degree-of-freedom driving module
2. Dual-degree-of-freedom driving module
3. Triangular bracket
4. First space
5. Second space
6. First casing
7. Right angle bracket
8. First motor bracket
9. First servo motor
10. First motor controller
11. First synchronous wheel
12. Bevel gear support bracket
13. Second synchronous wheel
14. First bevel gear
15. Second bevel gear
16. First harmonic reducer
17. First position-limiting plate
18. First conduit fixing bracket
19. First synchronous belt
20. Second motor bracket
21. Second servo motor
22. Second motor controller
23. Third synchronous wheel
24. Fourth synchronous wheel
25. Second harmonic reducer
26. Second position-limiting plate
27. Second positioning plate
28. Second conduit fixing bracket
29. second synchronous belt
30. Second casing
31. First mounting plate
32. Second mounting plate
33. Third motor bracket
34. Third servo motor
35. Fifth synchronous wheel -continued 36. Sixth synchronous wheel
37. Third harmonic reducer
38. Third position-limiting plate
39. Third positioning plate
40. Third conduit fixing bracket
41. Third synchronous belt
42. Base
43. Fixture
44. Wire tube
45. Wire tube guide support
46. Missing portion
47. Convex position
48. First sensor
49. Second sensor
50. Three sensors
51. First positioning plate
A, B, C, D, E, F and G respectively represent degree of freedom.

DESCRIPTION OF THE EMBODIMENTS

The content of the present disclosure will be further described in detail below with reference to the accompanying drawings and specific embodiments.

Embodiments

Referring to FIGS. 1 to 41, a multi-degree-of-freedom driving arm, including a single-degree-of-freedom driving module 1 located on an inner side and a plurality of dual-degree-of-freedom driving modules 2 disposed on an outer side and sequentially connected to each other from the inner side to the outer side, and the single-degree-of-freedom driving module is connected to the dual-degree-of-freedom driving module 2 located on the innermost side; the dual-degree-of-freedom driving module 2 has two orthogonal rotational degrees of freedom that are respectively a first rotational degree of freedom and a second rotational degree of freedom, and comprises a first driving mechanism that is configured to drive the dual-degree-of-freedom driving module 2 to rotate in the first rotational degree of freedom, and a second driving mechanism that is configured to drive the dual-degree-of-freedom driving module 2 to rotate in the second rotational degree of freedom; the first driving mechanism of the dual-degree-of-freedom driving module 2 located on the outer side is disposed on the second driving mechanism of the dual-degree-of-freedom driving module adjacent thereto and located on the inner side.

The single-degree-of-freedom driving module 1 is combined with several dual-degree-of-freedom driving modules 2, so that the robot arm becomes a multi-degree-of-freedom driving arm, which is more flexible, changeable, and adaptable, and can reduce the dependence on the tooling and the fixture 43, and is suitable for complicated tasks such as assembling work, etc.

The present disclosure designs and develops a dual-arm robot with 14 degrees of freedom (7 degrees of freedom for each arm), and the main body, the motor and the reducer adopt the existing high power density servo motors and harmonic reducers on the market. The dual-arm robot of the present disclosure is designed with a modular structure to ensure excellent interchangeability. As shown in figures, the main body of the dual-armed robot includes two arms with the same structural style.

The dual-degree-of-freedom driving module 2 includes a triangular bracket 3 separated by a diaphragm to form a first space 4 and a second space 5, a first casing 6 disposed on the triangular bracket 3 and configured to seal the first space 4 and the second space 5, and a right angle bracket 7; the first driving mechanism includes a first motor bracket 8 fixed in the first space 4, a first servo motor 9 fixed on the first motor bracket 8, a first motor controller 10 configured to drive the first servo motor 9, a first synchronous wheel 11 coupled to a driving shaft of the first servo motor 9 and driven by the first servo motor 9, a bevel gear support bracket 12 fixed in the first space 4, a second synchronous wheel 13, a first bevel gear 14, a second bevel gear 15, a first harmonic reducer 16, a first position-limiting plate 17, a first positioning plate 51 and a first conduit fixing bracket 18 through which a conduit passes; the second synchronous wheel 13 and the first bevel gear 14 are coupled to each other via a shaft, and integrally coupled to the bevel gear support bracket 12 via a bearing, and the second synchronous wheel 13 and the first bevel gear 14 are respectively located on two sides of the bevel gear support bracket 12; the first synchronous wheel 11 is coupled to the second synchronous wheel 13 via a first synchronous belt 19; the second bevel gear 15 is located in the first space 4, the first harmonic reducer 16 and the first position-limiting plate 17 are both located in the second space 5, and the first bevel gear 14 and the second bevel gear 15 are arranged to be engaged and connected at a right angle; the second bevel gear 15 is fixedly connected with an input end of the first harmonic reducer 16, the first conduit fixing bracket 18 is fixed on the center of the first positioning plate 51, the first position-limiting plate 17 is fixed on an output end of the first harmonic reducer 16, and the first conduit fixing bracket 18 sequentially passes through a through holes in a center of the first position-limiting plate 17, the first harmonic reducer 16, and the second bevel gear 15; the triangular bracket 3 is provided with a first mounting hole, and an end of the first harmonic reducer 16 where the input end is located is fixedly mounted on the diaphragm of the triangular bracket 3 around the first mounting hole; a horizontal plane of the right angle bracket 7 is provided with a second mounting hole, an end of the first harmonic reducer 16 where the output end is located passes through the second mounting hole, and the diaphragm of the right angle bracket 7 is fixed between the first harmonic reducer 16 and the first position-limiting plate 17 by clamping. The first motor controller 10 drives the first servo motor 9 to drive the first synchronous wheel 11 and the second synchronous wheel 13 to rotate, thereby driving the first bevel gear 14 and the second bevel gear 15 engaged therewith to rotate, and under the action of the first harmonic reducer and the first position-limiting plate 17, the clamped right angle bracket 7 rotates around the axis of the second bevel gear 15 and the first harmonic reducer, thereby realizing a rotation in one degree of freedom.

The second driving mechanism includes a second motor bracket 20 fixed in the first space 4, a second servo motor 21 fixed on the second motor bracket 20, a second motor controller 22 configured to drive the second servo motor 21, a third synchronous wheel 23 driven by the rotating shaft of the second servo motor 21, a fourth synchronous wheel 24, a second harmonic reducer 25 fixed coaxially with the fourth synchronous wheel 24, a second position-limiting plate 26, a second positioning plate 27 and a second conduit fixing bracket 28 through which the conduit passes; the third synchronous wheel 23 is coupled to the fourth synchronous wheel 24 via a second synchronous belt 29; a side surface of the triangular bracket 3 is provided with a third mounting hole through which the rotating shaft of the fourth synchronous wheel 24 passes, the rotating shaft of the fourth synchronous wheel 24 is fixedly connected with the input end of the second harmonic reducer 25, an end of the second harmonic reducer 25 where the input end is located is fixedly mounted on a side surface of the triangular bracket 3 around the third mounting hole in the dual-degree-of-freedom driving module 2 adjacent thereto, the second conduit fixing bracket 28 is fixed on the center of the second positioning plate 27, the second position-limiting plate 26 is fixed on the output end of the second harmonic reducer 25, the second conduit fixing bracket 28 sequentially passes through a through holes in a center of the second position-limiting plate 26, the second harmonic reducer 25, and the fourth bevel gear 24, and clamps the side surface of the triangular bracket 3 between the second harmonic reducer 25 and the second positioning plate 27. The second motor controller 22 drives the second servo motor 21 to drive the third synchronous wheel 23 and the fourth synchronous wheel 24 to rotate, and under the action of the second harmonic reducer and the second position-limiting plate 26, the dual-degree-of-freedom driving module 2 rotates around the axis of the fourth bevel gear 24 and the second harmonic reducer, thereby realizing a rotation in another degree of freedom.

The side surface of the triangular bracket 3 located between adjacent dual-degree-of-freedom driving modules 2 is provided with a second casing 30 configured to cover the second harmonic reducer 25.

The single-degree-of-freedom driving module 1 includes a first mounting plate 31, a second mounting plate 32 mounted perpendicularly to the first mounting plate 31, a third motor bracket 33 disposed on the first mounting plate 31, a third servo motor 34 fixed on the third motor bracket 33, a fifth synchronous wheel 35 connected to the driving shaft of the third servo motor 34 and driven by the third servo motor 34, a sixth synchronous wheel 36, a third harmonic reducer 37 fixed coaxially with the sixth synchronous wheel 36, and a third position-limiting plate 38, a third positioning plate 39 and a third conduit fixing bracket 40 through which the conduit passes; the fifth synchronous wheel 35 is coupled to the sixth synchronous wheel 36 via a third synchronous belt 41; the rotating shaft of the six synchronous wheel 36 is fixedly connected with an input end of the third harmonic reducer 37, and the second mounting plate 32 is clamped between the sixth synchronous wheel 36 and the third harmonic reducer 37, an end of the third harmonic reducer 37 where the input end is located is fixedly mounted on the second mounting plate 32; the end of the third harmonic reducer 37 where the input end is located is fixedly mounted on the side surface of the triangular bracket 3 around the third mounting hole in the dual-degree-of-freedom driving module 2 adjacent thereto; the third conduit fixing bracket 40 is fixed on the center of the third positioning plate 39, the third position-limiting plate 38 is fixed on an output end of the third harmonic reducer 37, and the third conduit fixing bracket 40 sequentially passes through the side surface of the triangular bracket 3 in the dual-degree-of-freedom driving module 2 adjacent to the single-degree-of-freedom driving module 1, a through holes in a center of the third position-limiting plate 38, the third harmonic reducer 37, and the sixth synchronous wheel 36, and the side surface of the triangular bracket 3 is clamped between the third harmonic reducer 37 and the third positioning plate 39. The third servo motor 34 drives the fifth synchronous wheel 35 and the sixth synchronous wheel 36, and under the action of the third harmonic reducer 37 and the third position-limiting plate 38, the dual-degree-of-freedom driving module 2 adjacent and connected to the single-degree-of-freedom driving module 1 is driven to rotates around the axis of the sixth synchronous wheel 36 and the third harmonic reducer 37, thereby realizing the rotation of the dual-degree-of-freedom driving module 2 in one degree of freedom.

The first position-limiting plate 17 is cut out inward partially at its periphery to form a missing portion 46 and a convex portion 47 which are spaced apart from each other, the diaphragm at the periphery of the first harmonic reducer 16 is provided with three first sensors 48 that are distributed with intervals of 45 degrees, and when the first position-limiting plate 17 rotates with the second bevel gear 15, the first sensors 48 is aligned with the missing position 46 or the convex position 47 on the first position-limiting plate 17; the structures of the second position-limiting plate 26 and the third position-limiting plate 38 are consistent with the structure of the first position-limiting plate 17; the side surface of the triangular bracket 3 on the periphery of the second harmonic reducer 25 is provided with three second sensors 49 that are distributed with intervals of 45 degrees, and when the second position-limiting plate 26 rotates with the fourth synchronous wheel 24, the second sensors 49 is aligned with a missing position 46 or a convex position 47 of the second position-limiting plate 26; The second mounting plate 32 on the periphery of the third harmonic reducer 37 is provided with three third sensors 50 that are distributed with intervals of 45 degrees, and when the third position-limiting plate 38 rotates with the sixth synchronous wheel 36, the third sensors 50 is aligned with a missing position 46 or a convex position 47 of the third position-limiting plate 38.

It is provided with three dual-degree-of-freedom driving modules 2. The three dual-degree-of-freedom driving modules 2 are combined with one single-degree-of-freedom driving module 1 to form a robot arm with seven degrees of freedom for each arm, which makes the arm more flexible.

The dual-arm robot includes a base 42, two sets of multi-degree-of-freedom driving arms disposed on the base 42, and a fixture 43 disposed on an outer end of the multi-degree-of-freedom driving arm; each set of multi-degree-of-freedom driving arm includes three dual-degree-of-freedom driving modules 2 sequentially connected to each other from the inner side to the outer side, and the dual-degree-of-freedom driving module 2 located on the inner side is connected with a single-degree-of-freedom driving module 1 connected to the base 42, and the fixture 43 is connected to the dual-degree-of-freedom driving module 2 located on the outer side; all ends of the first servo motor 9 are provided with a relative encoder and a band brake that are configured to control the first sensor 48 and the position limiting information of the first position-limiting plate 17, and the dual-arm robot is provided with a processing module configured to receive and process the feedback information transmitted from the relative encoder; The relative encoder and the band brake used in the ends of the second servo motor 21 and the third servo motor 34 have the same structures as those used in the first servo motor 9.

Figure 7:
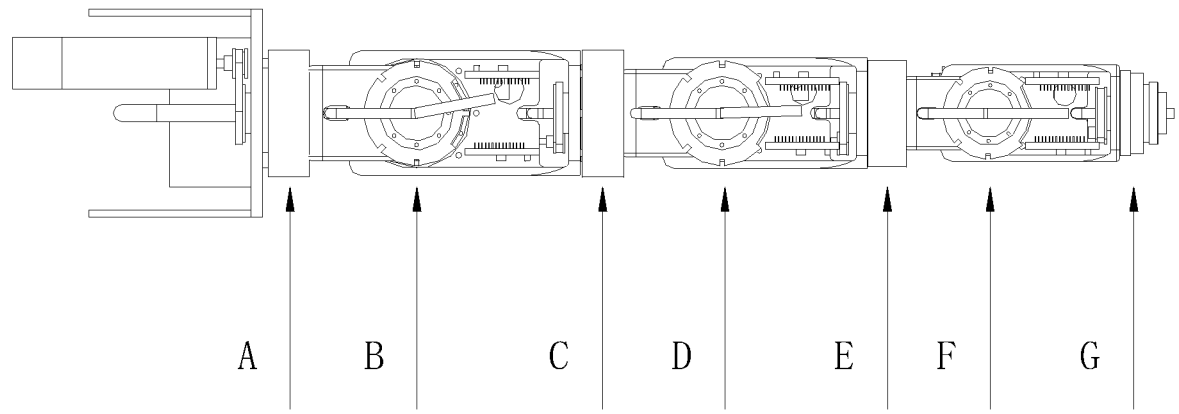
FIG. 7 is a top view illustrating a single arm with seven degrees of freedom according to an embodiment of the present disclosure.
Figure 8:
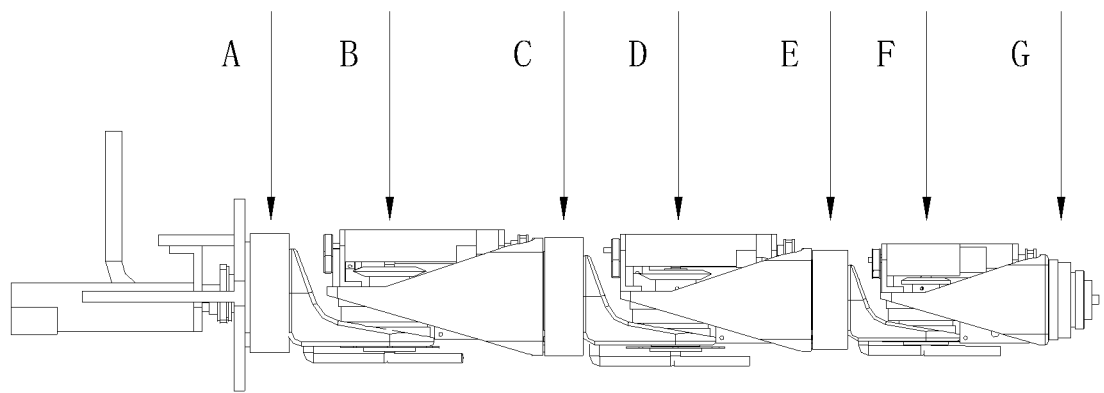
FIG. 8 is a front view illustrating a single arm with seven degrees of freedom according to an embodiment of the present disclosure.
Figure 9:
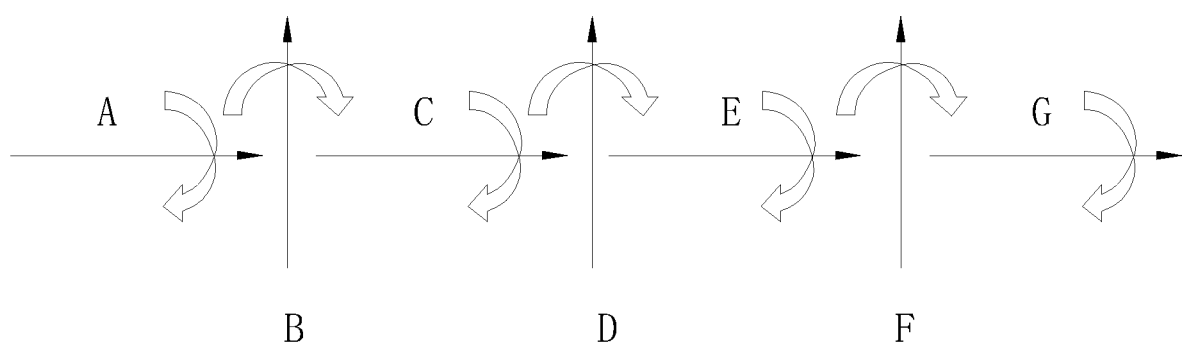
FIG. 9 is a model view illustrating a distribution of seven degrees of freedom according to an embodiment of the present disclosure.
Figure 10:
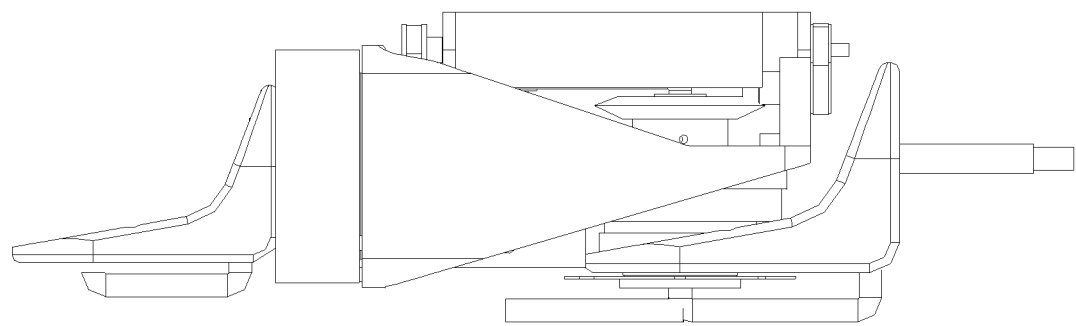
FIG. 10 is a front view illustrating a dual-degree-of-freedom driving module according to an embodiment of the present disclosure.
Figure 11:
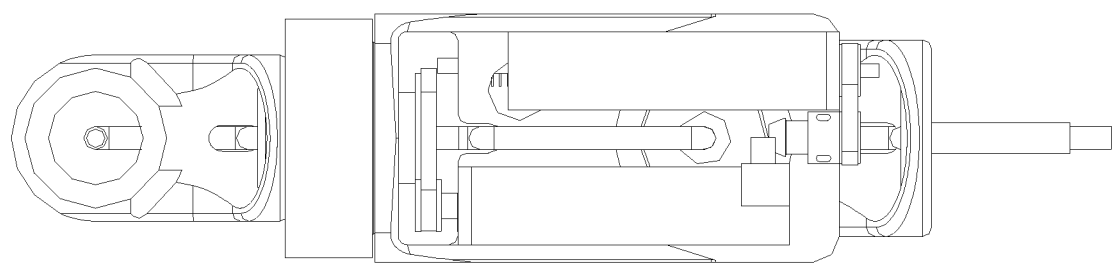
FIG. 11 is a top view illustrating a dual-degree-of-freedom driving module according to an embodiment of the present disclosure.
Figure 12:
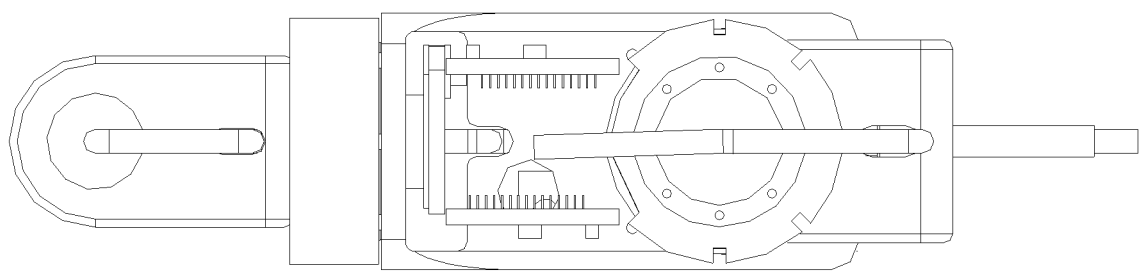
FIG. 12 is a bottom view illustrating a dual-degree-of-freedom driving module according to an embodiment of the present disclosure.
Figure 13:
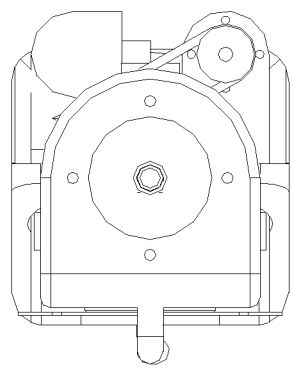
FIG. 13 is a right view illustrating a dual-degree-of-freedom driving module according to an embodiment of the present disclosure.
Figure 14:
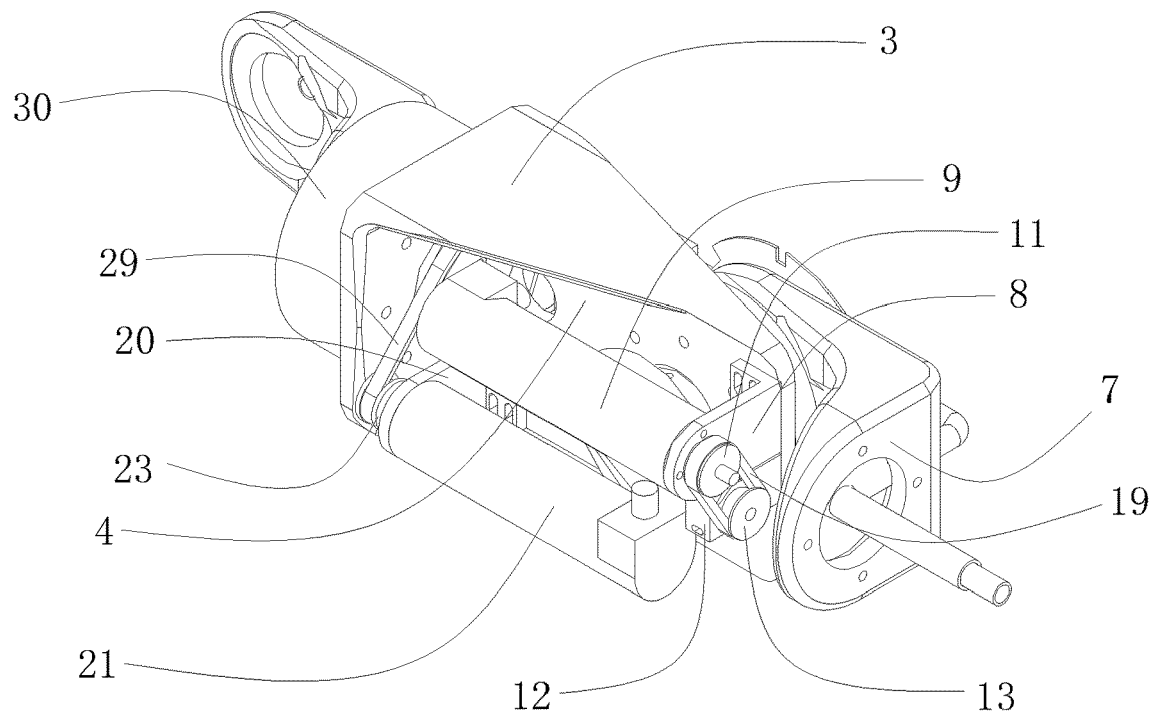
FIG. 14 is a structural schematic view I illustrating a dual-degree-of-freedom driving module according to an embodiment of the present disclosure.
Figure 15:
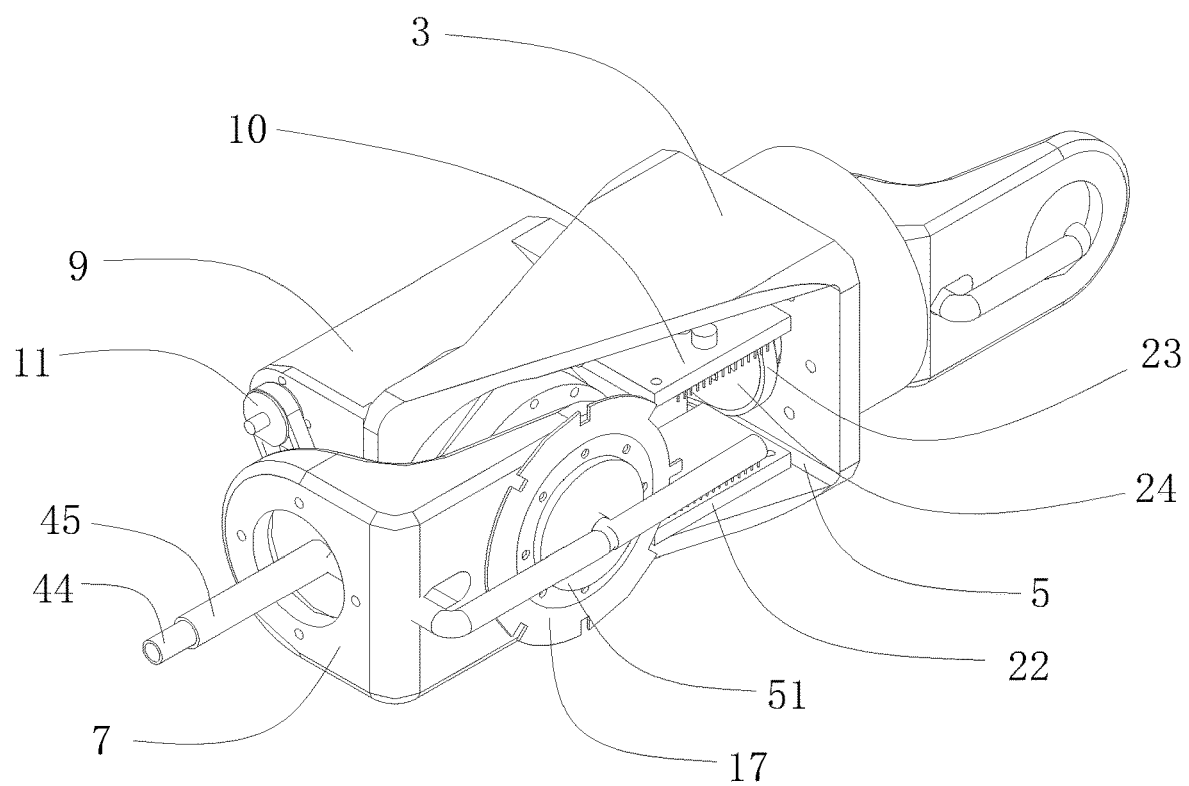
FIG. 15 is a structural schematic view II illustrating a dual-degree-of-freedom driving module according to an embodiment of the present disclosure.

Referring to FIGS. 7 and 8, there are a top view and a front view illustrating the structure of the single arm with seven degrees of freedom. FIG. 9 illustrates the distribution model of seven degrees of freedom, in which seven orthogonal rotating shafts are alternately connected, and the specific state of the rotation of the single-arm structure around the center of rotation is shown in FIGS. 38 to 41.

Figure 16:
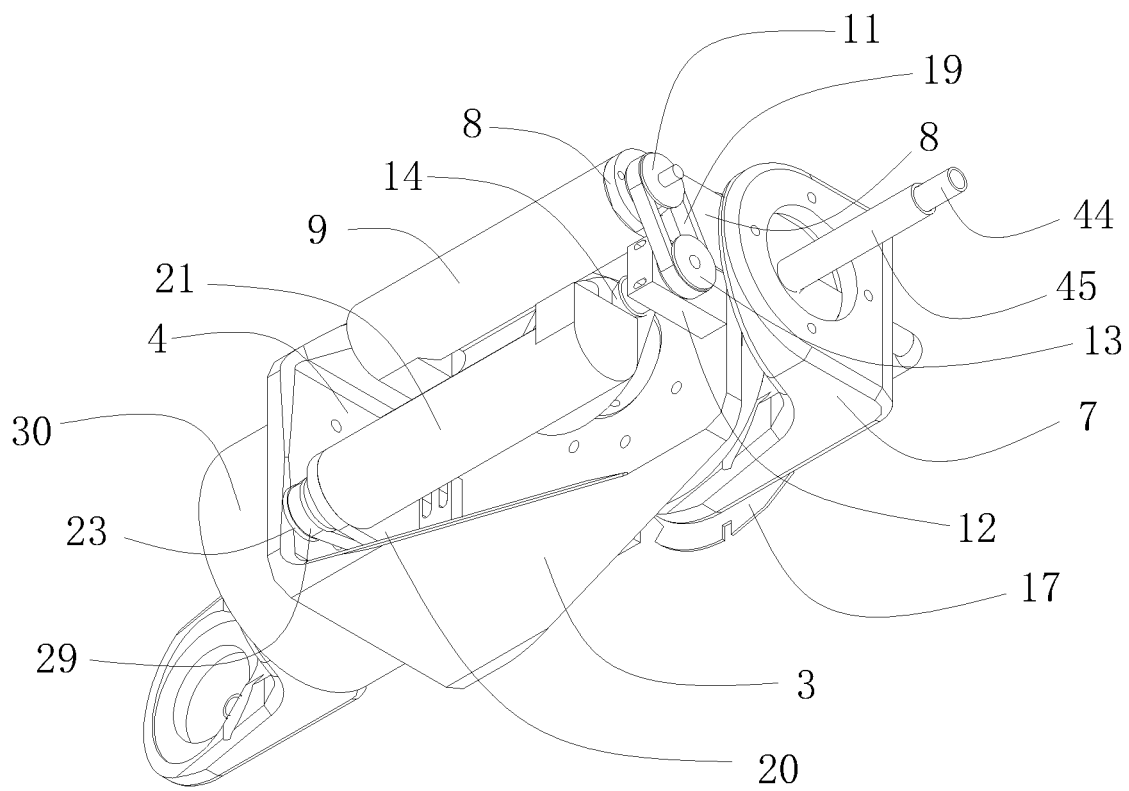
FIG. 16 is a structural schematic view III illustrating a dual-degree-of-freedom driving module according to an embodiment of the present disclosure.
Figure 17:
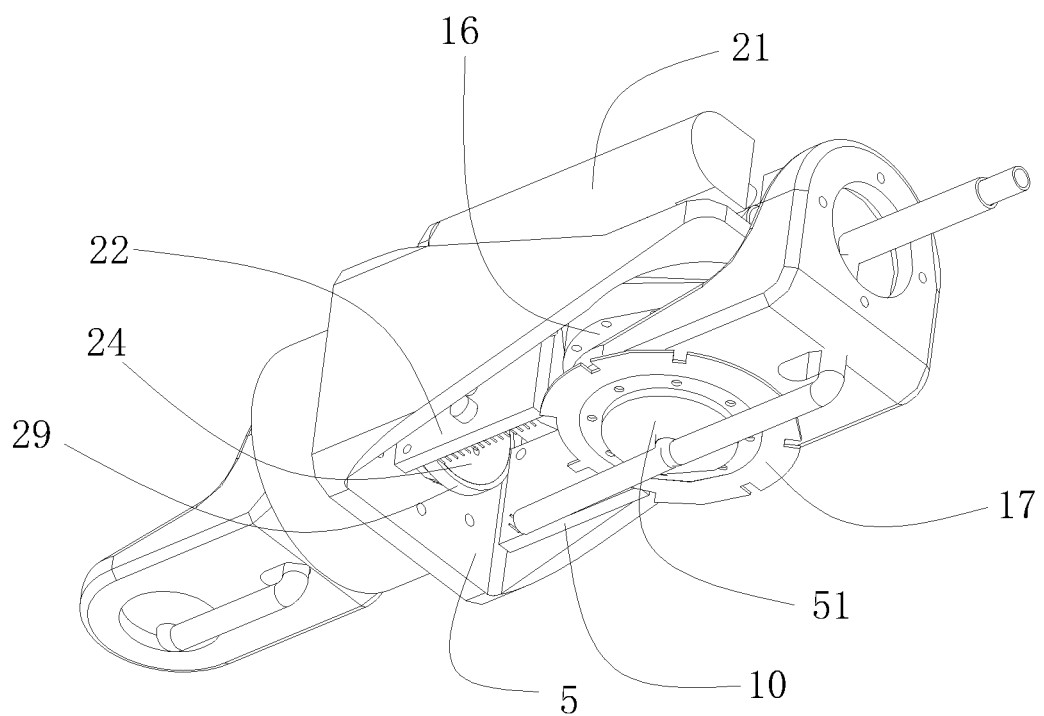
FIG. 17 is a structural schematic view IV illustrating a dual-degree-of-freedom driving module according to an embodiment of the present disclosure.

Referring to FIGS. 16 and 17, a single dual-degree-of-freedom driving module 2 has two orthogonal rotational degrees of freedom, the swing drive in each of which is achieved by one servo motor and one harmonic reducer; the robot supplies electric power to the arm, and the electric power is transmitted to each driving mechanism through wires. The wire includes a wire tube 44 and a wire tube guide support 45 wrapped around the outer circumference of the wire tube 44 to form the conduit; the conduit passes through the first conduit fixing bracket 18, the second conduit fixing bracket 28, and the third conduit fixing bracket 40 to power the three servo motors and the motor controller.

Figure 18:
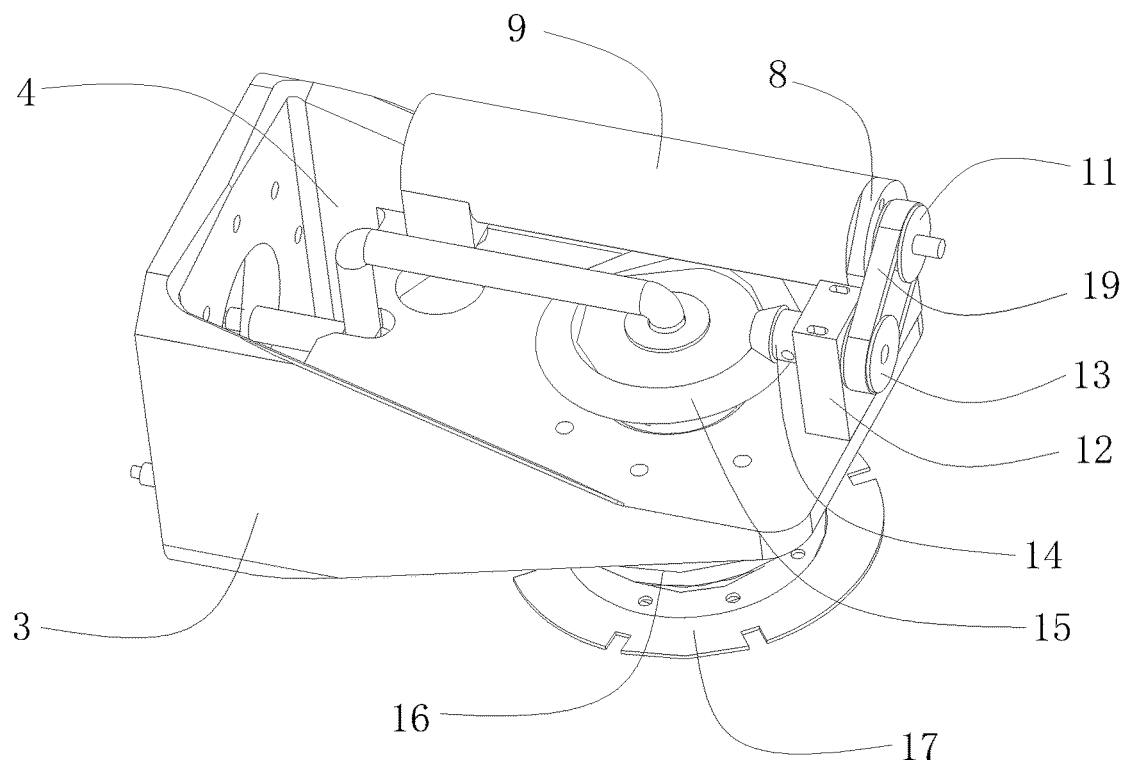
FIG. 18 is a structural schematic view V illustrating a dual-degree-of-freedom driving module according to an embodiment of the present disclosure.
Figure 19:
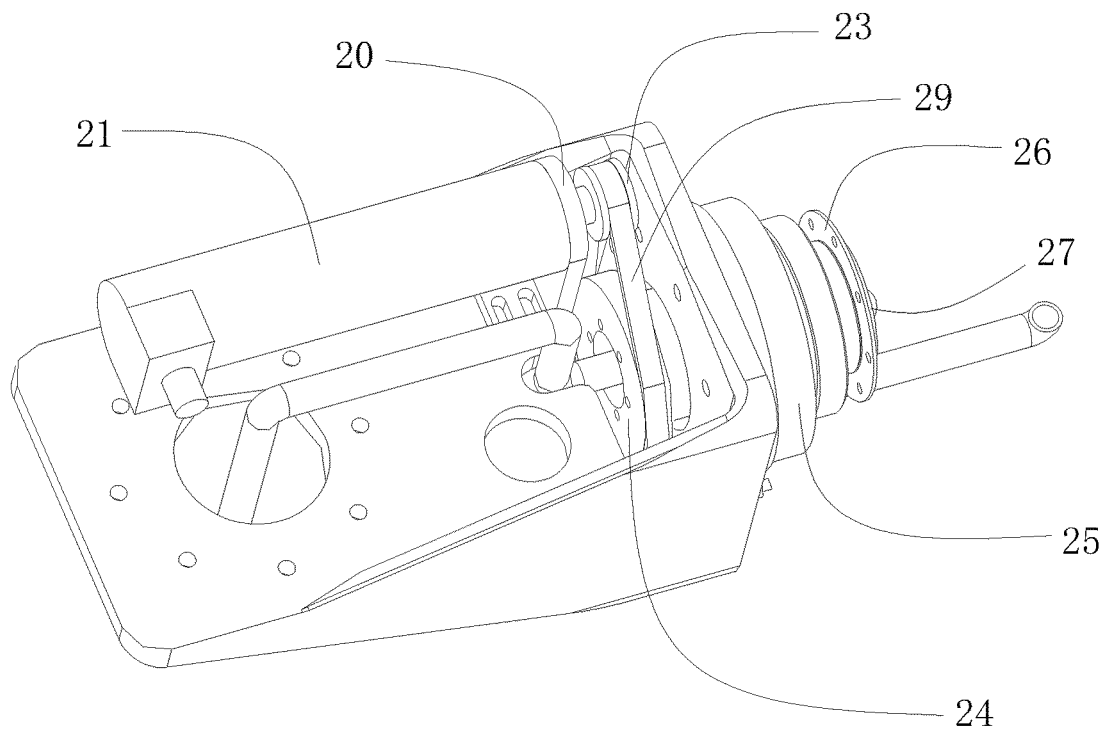
FIG. 19 is a structural schematic view VI illustrating a dual-degree-of-freedom driving module according to an embodiment of the present disclosure.
Figure 20:
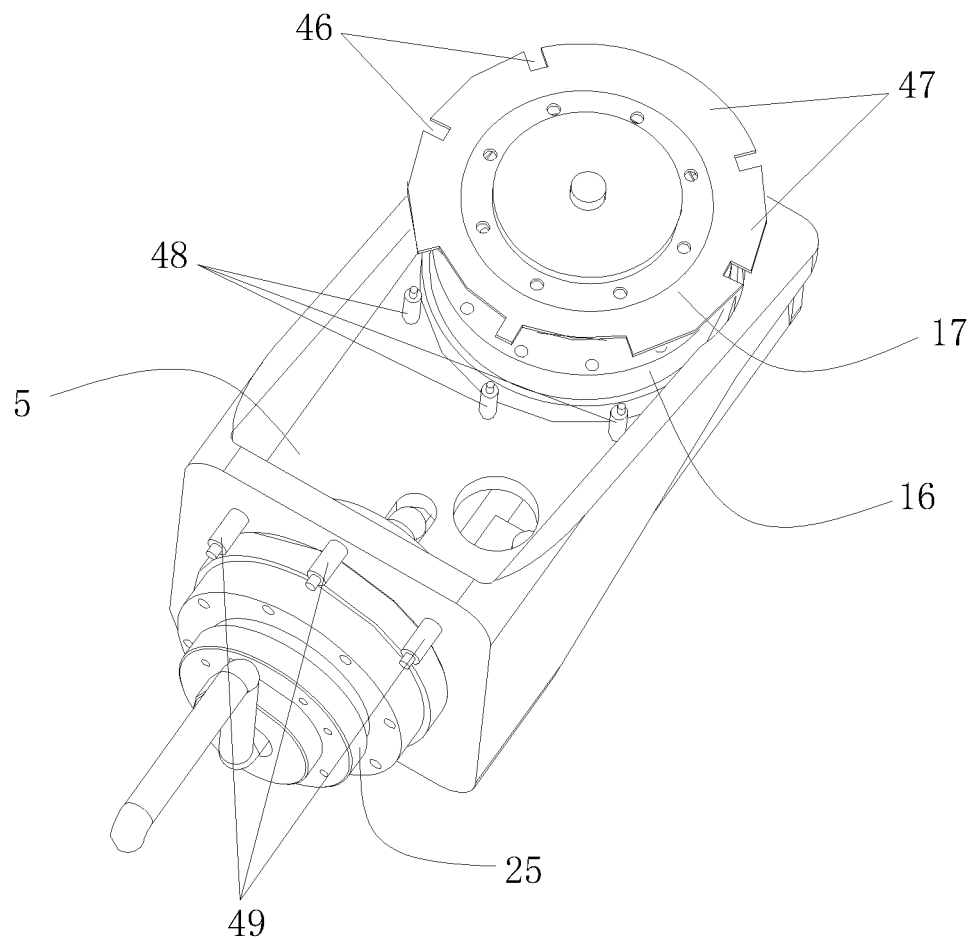
FIG. 20 is a structural schematic view VII illustrating a dual-degree-of-freedom driving module according to an embodiment of the present disclosure.
Figure 21:
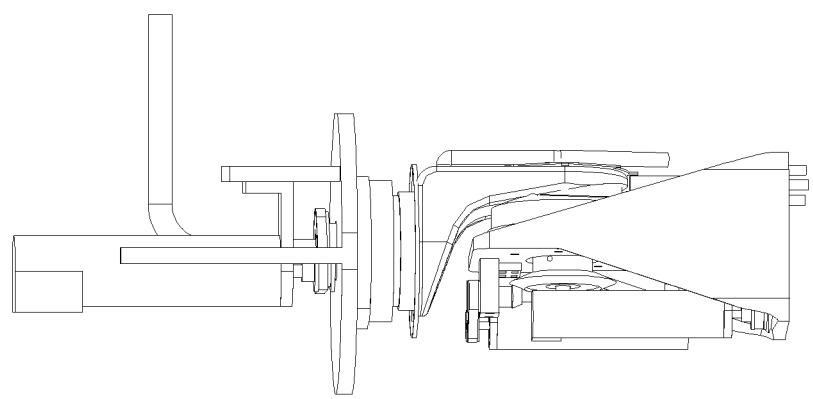
FIG. 21 is a front view illustrating that the single-degree-of-freedom driving module is used in conjunction with the dual-degree-of-freedom driving module, in accordance with an embodiment of the present disclosure.
Figure 22:
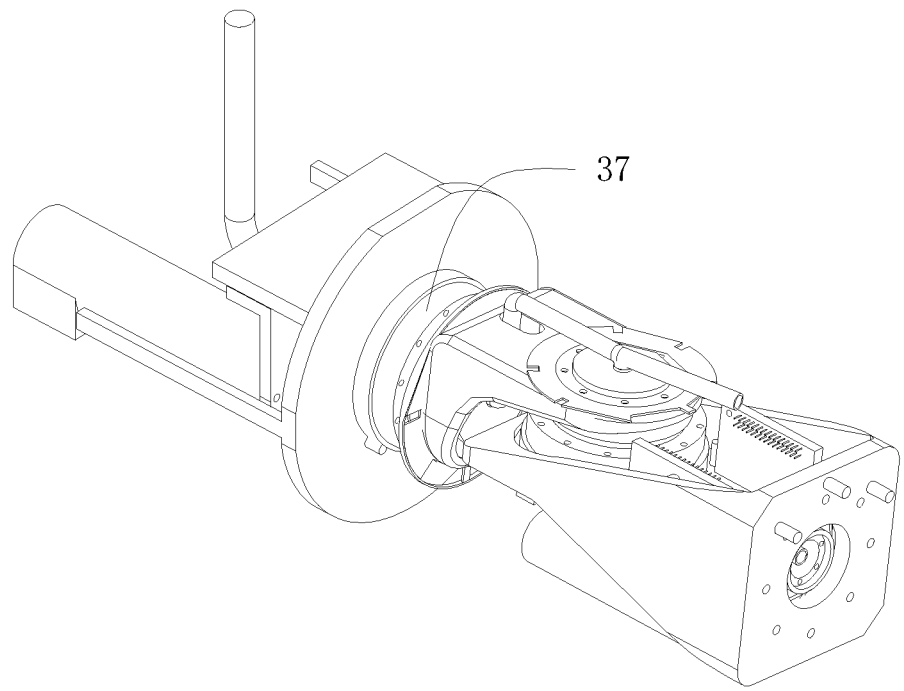
FIG. 22 is a structural schematic view I illustrating that the single-degree-of-freedom driving module is used in conjunction with the dual-degree-of-freedom driving module, in accordance with an embodiment of the present disclosure.
Figure 23:
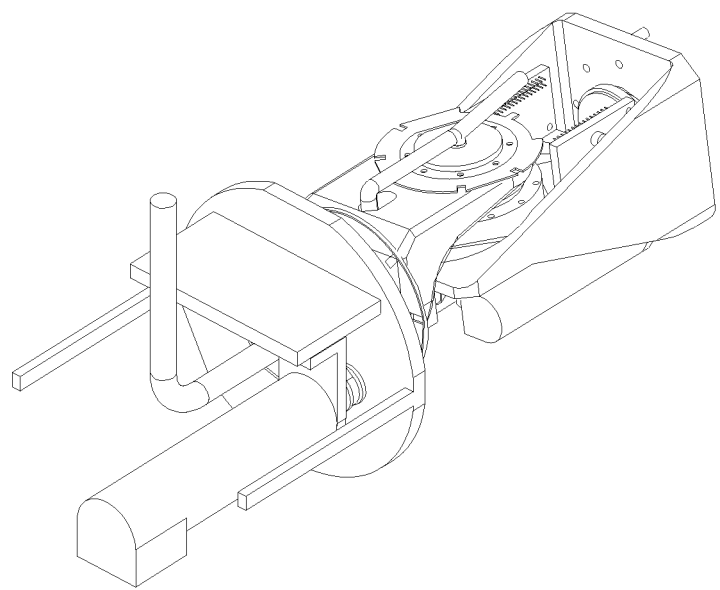
FIG. 23 is a structural schematic view II illustrating that the single-degree-of-freedom driving module is used in conjunction with the dual-degree-of-freedom driving module, in accordance with an embodiment of the present disclosure.
Figure 24:
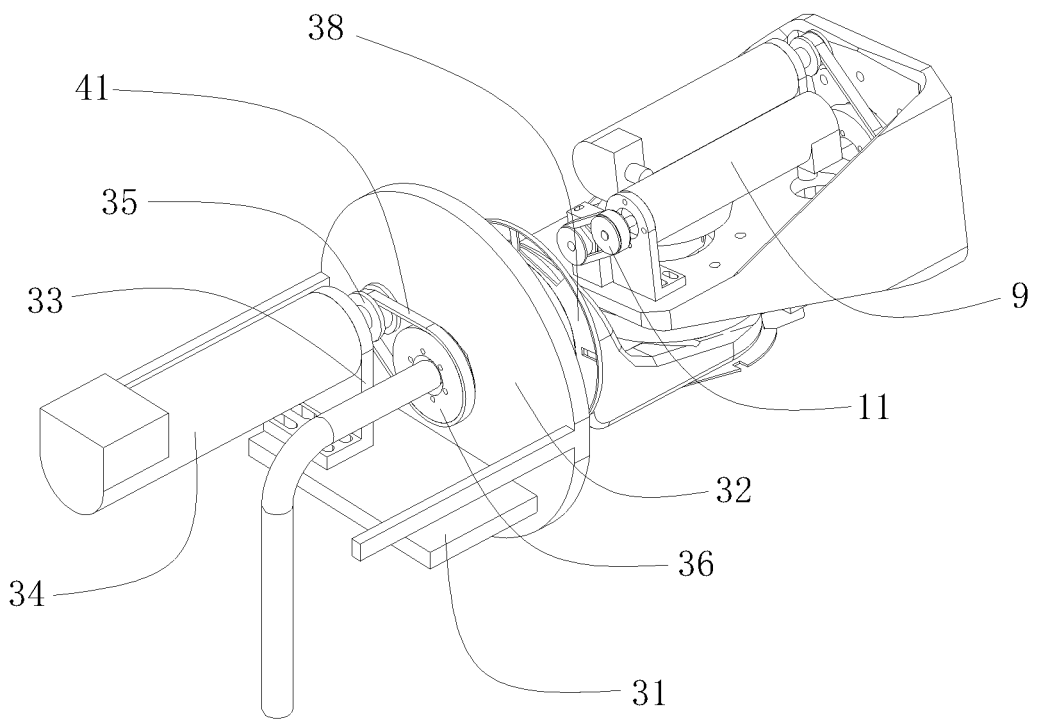
FIG. 24 is a structural schematic view III illustrating that the single-degree-of-freedom driving module is used in conjunction with the dual-degree-of-freedom driving module, in accordance with an embodiment of the present disclosure.
Figure 25:
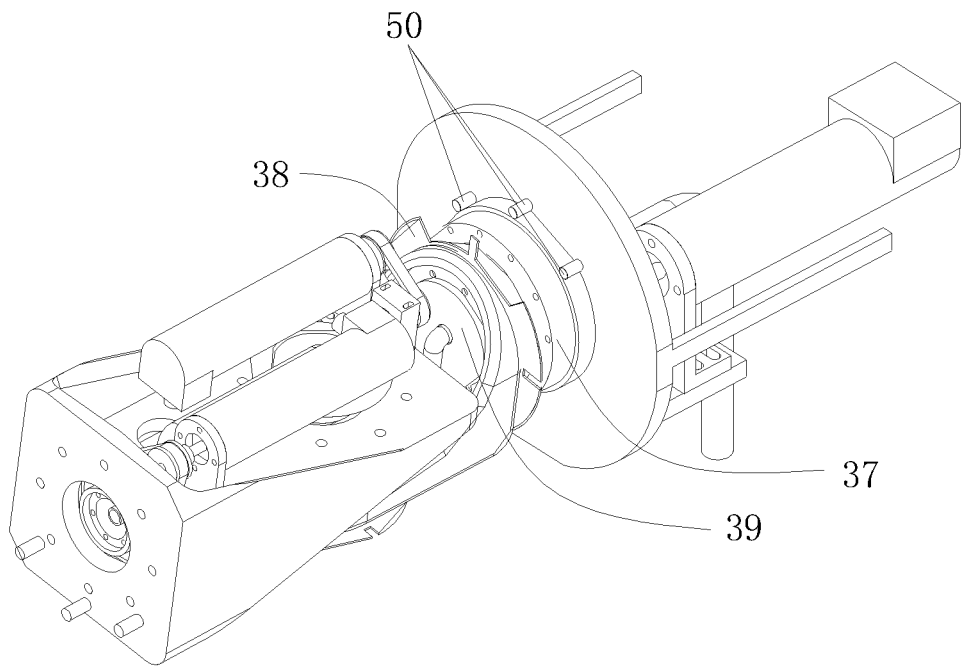
FIG. 25 is a structural schematic view IV illustrating that the single-degree-of-freedom driving module is used in conjunction with the dual-degree-of-freedom driving module, in accordance with an embodiment of the present disclosure.
Figure 26:
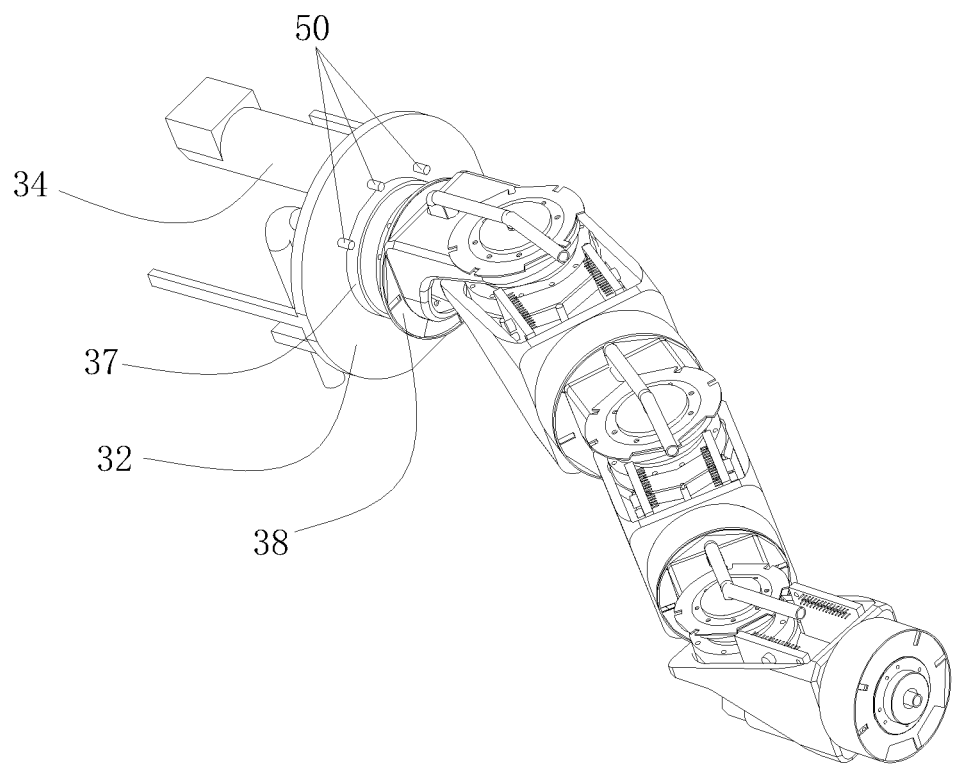
FIG. 26 is a reference view I illustrating the usage state according to an embodiment of the present disclosure.
Figure 27:
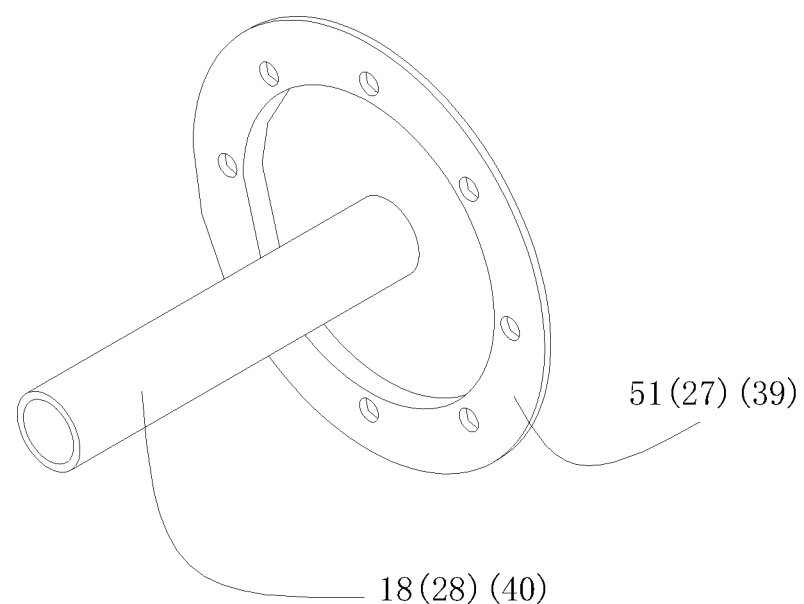
FIG. 27 is a perspective view illustrating the installation of a conduit fixing bracket and a positioning plate according to an embodiment of the present disclosure.
Figure 28:
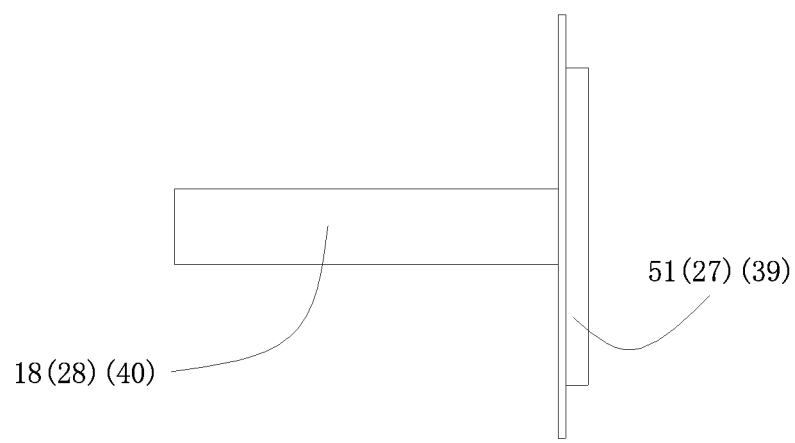
FIG. 28 is a front view illustrating the installation of a conduit fixing bracket and a positioning plate according to an embodiment of the present disclosure.

Referring to FIG. 18, the single dual-degree-of-freedom driving module 2 is shown as the driving mechanism of degrees of freedom B, D, and F in FIG. 9; Referring to FIG. 19, the single dual-degree-of-freedom driving module 2 is shown as the driving mechanism of degrees of freedom C, E, and G in FIG. 9;

Referring to FIG. 20, it illustrates the design of mechanism limiting. In this embodiment, it is includes three types of sensors, such as, a first sensor 48, a second sensor 49, and a third sensor 50, and each type of sensor adopts a reflective photoelectric sensor and includes three sensors, and the three sensors in each type are centered on the center axis of the harmonic reducer of the corresponding mechanism and distributed with intervals of 45 degrees intervals around the harmonic reducer. The first sensor 48, the first conduit fixing bracket 18 and the first position-limiting plate 17 form a position limiting switch of the first harmonic reducer 16; the second sensor 49, the second conduit fixing bracket 28 and the second position-limiting plate 26 form a position limiting switch of the second harmonic reducer 25; The third sensor 50 and the third conduit fixing bracket 40 and the third position-limiting plate 38 form a position limiting switch of the third harmonic reducer 37.

The position limiting principle is that when the reflective photoelectric sensor illuminates a signal light on the edge of the position-limiting plate, the shape of the edge of the position-limiting plate can allow the optical signal to be blocked and reflected, or allow the optical signal to pass. If it is reflected, the optical signal of the sensor is blocked and reflected by the convex position 47; if it is passed, the optical signal of the sensor passes through the missing position 46. By designing the shape of the edge of the position-limiting plate to match the relative position of the reflective photoelectric sensor, the detection of 8 different position states of the position-limiting plate can be realized.

The analysis is carried out by taking the position limiting design shown in FIG. 20 as an example, which involves the components of the first driving mechanism. It is given that the number 1 indicates the position where the optical signal is blocked and reflected by the convex position 47 and the number 0 indicates the position where the optical signal passes through the missing portion 46 of the position-limiting plate, then the numbers indicating the eight position states (also called photoelectric sensor signal) are: 000, 001, 010, 011, 100, 101, 110, and 111. The positional states corresponding to each number are shown in FIGS. 29 to 37, respectively.

Figure 29:
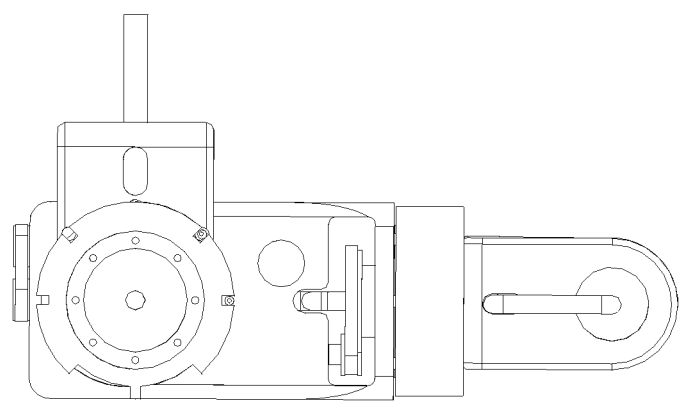
FIG. 29 is a structural schematic view illustrating that a motion mechanism in a dual-degree-of-freedom driving module is in a right position limiting state according to an embodiment of the present disclosure.

FIG. 29 illustrates the right position limiting state with the photoelectric sensor signal at 100 (sorting starts from the leftmost sensor). This position is the extreme position that can be reached by rotating to the right.

Figure 30:
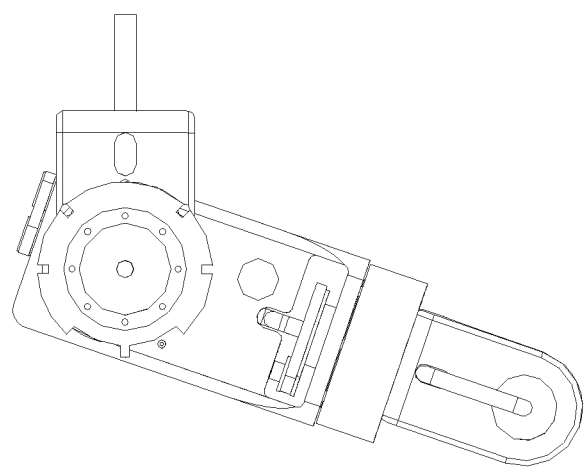
FIG. 30 is a structural schematic view illustrating that a motion mechanism in a dual-degree-of-freedom driving module is in a lower right (0-45 degrees) state according to an embodiment of the present disclosure.

FIG. 30 illustrates the motion mechanism in the lower right (0-45 degrees) state with the photoelectric sensor signal at 011 (sorting starts from the leftmost sensor). This position is the extreme position that can be reached by rotating to the right.

Figure 31:
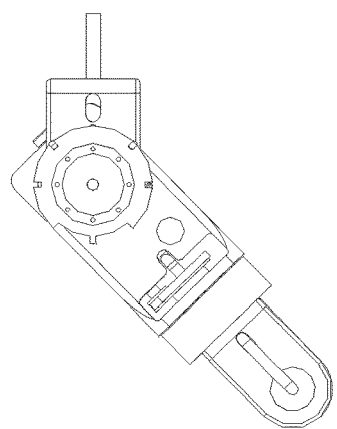
FIG. 31 is a structural schematic view illustrating that a motion mechanism in a dual-degree-of-freedom driving module is in a lower right (45 degrees) state degrees according to an embodiment of the present disclosure.

FIG. 31 illustrates the motion mechanism in the lower right (45 degrees) state with the photoelectric sensor signal at 110 (sorting starts from the leftmost sensor).

Figure 32:
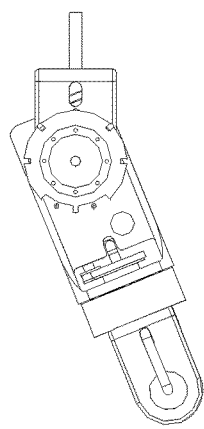
FIG. 32 is a structural schematic view illustrating that a motion mechanism in a dual-degree-of-freedom driving module is in a lower right (45-90 degrees) state according to an embodiment of the present disclosure.

FIG. 32 illustrates the motion mechanism in the lower right (45-90 degrees) state with the photoelectric sensor signal at 001 (sorting starts from the leftmost sensor).

Figure 33:
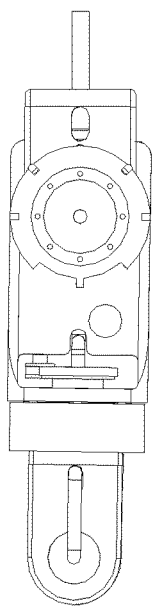
FIG. 33 is a structural schematic view illustrating a state in which a motion mechanism in a dual-degree-of-freedom driving module vertically points down (90 degrees), in accordance with an embodiment of the present disclosure.

FIG. 33 illustrates the motion mechanism in a state of vertically pointing down (90 degrees) with the photoelectric sensor signal at 000 (sorting starts from the leftmost sensor). This position is the middle position of the travel.

Figure 34:
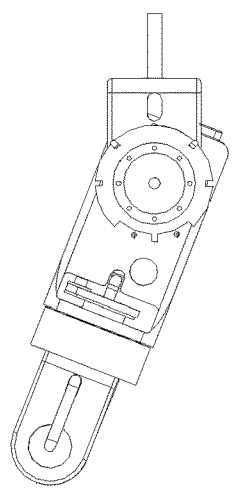
FIG. 34 is a structural schematic view illustrating that a motion mechanism in a dual-degree-of-freedom driving module is in a lower right (45-90 degrees) state according to an embodiment of the present disclosure.

FIG. 34 illustrates the motion mechanism in the lower left (45-90 degrees) state with the photoelectric sensor signal at 011 (sorting starts from the leftmost sensor).

Figure 35:
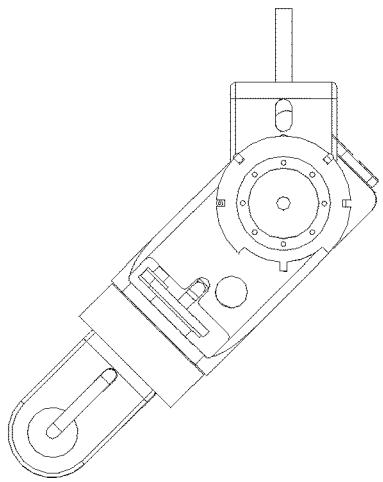
FIG. 35 is a structural schematic view illustrating that a motion mechanism in a dual-degree-of-freedom driving module is in a lower right (45 degrees) state according to an embodiment of the present disclosure.

FIG. 35 illustrates the motion mechanism in the lower left (45 degrees) state with the photoelectric sensor signal at 100 (sorting starts from the leftmost sensor).

Figure 36:
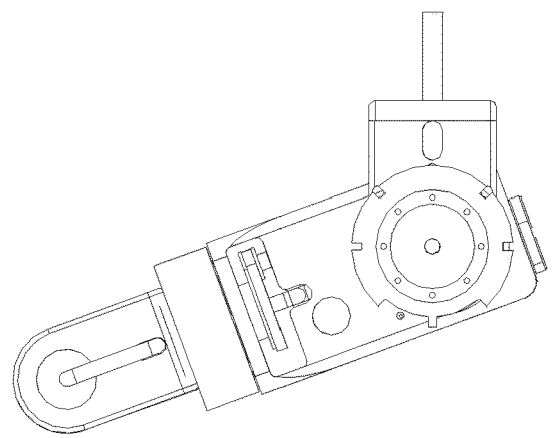
FIG. 36 is a structural schematic view illustrating that a motion mechanism in a dual-degree-of-freedom driving module is in a lower right (0-45 degrees) state according to an embodiment of the present disclosure.

FIG. 36 illustrates the motion mechanism in the lower left (0-45 degrees) state with the photoelectric sensor signal at 110 (sorting starts from the leftmost sensor).

Figure 37:
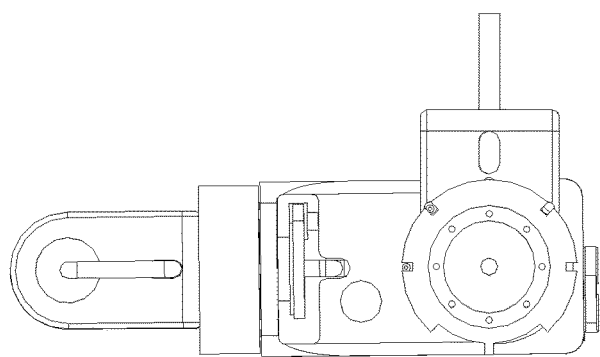
FIG. 37 is a structural schematic view illustrating that a motion mechanism in a dual-degree-of-freedom driving module is in a left position limiting state according to an embodiment of the present disclosure.
Figure 38:
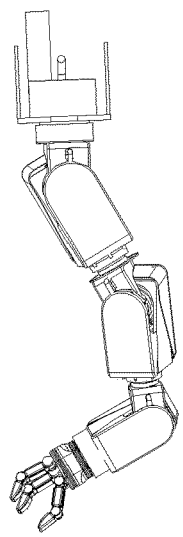
FIG. 38 is a reference view II illustrating the usage state according to an embodiment of the present disclosure.
Figure 39:
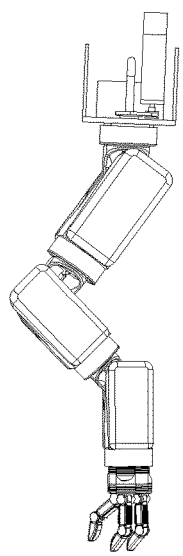
FIG. 39 is a reference view III illustrating the usage state according to an embodiment of the present disclosure.
Figure 40:
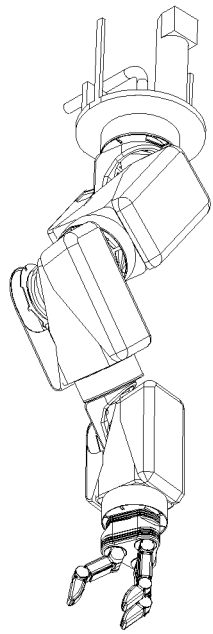
FIG. 40 is a reference view IV illustrating the usage state according to an embodiment of the present disclosure.
Figure 41:
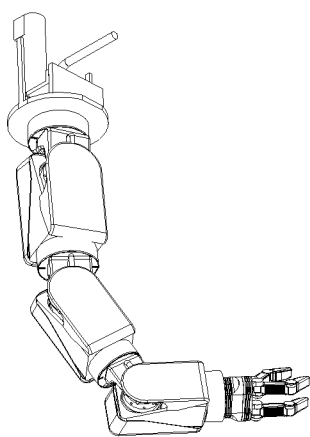
FIG. 41 is a reference view V illustrating the usage state according to an embodiment of the present disclosure.

FIG. 37 illustrates the motion mechanism in the left state with the photoelectric sensor signal at 001 (sorting starts from the leftmost sensor). This position is the extreme position that can be reached by rotating to the left.

The principle of the position limiting design shown by reference numeral 49 in FIG. 20 is identical to that of the position limiting design shown by reference numeral 48 in FIG. 20. The end of the servo motor is equipped with the relative encoder and the band brake. The accurate absolute position feedback can be realized by the position limiting information and the feedback information of the encoder.

The position limiting design of the second sensor 49 involves the components of the second driving mechanism, such as the second sensor 49, the second harmonic reducer 25, the second position-limiting plate 26, etc., and the principle of the position limiting design of the second sensor 49 is identical to that of the position limiting mechanism of the first driving mechanism. The position limiting design of the single-degree-of-freedom driving module 1 involves the third sensor 50, the third harmonic reducer 37, the third position-limiting plate 38, etc., and the principle of the position limiting design of the single-degree-of-freedom driving module 1 is identical to that of the position limiting mechanism of the first driving mechanism. In the position limiting design of the present embodiment, the end of the servo motor is equipped with the relative encoder and the band brake. The accurate absolute position feedback can be realized by the position limiting information and the feedback information of the encoder.

The above-mentioned detailed description is the detailed description of feasible embodiments of the present disclosure, which is not intended to limit the scope of the present disclosure, and equivalent implementations or modifications that do not depart from the present disclosure are intended to be included in the scope of the present disclosure.

What is claimed is:

1. A multi-degree-of-freedom driving arm, comprising a single-degree-of-freedom driving module located on an inner side and a plurality of dual-degree-of-freedom driving modules disposed on an outer side and sequentially connected to each other from the inner side to the outer side, and the single-degree-of-freedom driving module is connected to one of the plurality of dual-degree-of-freedom driving modules located on the innermost side; each of the plurality of dual-degree-of-freedom driving modules has two orthogonal rotational degrees of freedom that are respectively a first rotational degree of freedom and a second rotational degree of freedom, and comprises a first driving mechanism that is configured to drive the dual-degree-of-freedom driving module to rotate in the first rotational degree of freedom, and a second driving mechanism that is configured to drive the dual-degree-of-freedom driving module to rotate in the second rotational degree of freedom; the first driving mechanism of each of the plurality of dual-degree-of-freedom driving modules located on the outer side is disposed on the second driving mechanism of the dual-degree-of-freedom driving module adjacent thereto and located on the inner side, wherein the dual-degree-of-freedom driving module comprises a triangular bracket separated by a diaphragm to form a first space and a second space, a first casing disposed on the triangular bracket and configured to seal the first space and the second space, and a right angle bracket; the first driving mechanism comprises a first motor bracket fixed in the first space, a first servo motor fixed on the first motor bracket, a first motor controller configured to drive the first servo motor, a first synchronous wheel coupled to a driving shaft of the first servo motor and driven by the first servo motor, a bevel gear support bracket fixed in the first space, a second synchronous wheel, a first bevel gear, a second bevel gear, a first harmonic reducer, a first position-limiting plate, a first positioning plate and a first conduit fixing bracket through which a conduit passes; the second synchronous wheel and the first bevel gear are coupled to each other via a shaft and, as a whole, coupled to the bevel gear support bracket via a bearing, and the second synchronous wheel and the first bevel gear are respectively located on two sides of the bevel gear support bracket; the first synchronous wheel is coupled to the second synchronous wheel via a first synchronous belt; the second bevel gear is located in the first space, the first harmonic reducer and the first position-limiting plate are both located in the second space, and the first bevel gear and the second bevel gear are arranged to be engaged and connected at a right angle; the second bevel gear is fixedly connected with an input end of the first harmonic reducer, the first conduit fixing bracket is fixed on a center of the first positioning plate, the first position-limiting plate is fixed on an output end of the first harmonic reducer, and the first conduit fixing bracket sequentially passes through a through hole in a center of the first position-limiting plate, the first harmonic reducer, and the second bevel gear; the triangular bracket is provided with a first mounting hole, and an end of the first harmonic reducer where the input end is located is fixedly mounted on a diaphragm of the triangular bracket around the first mounting hole; a horizontal plane of the right angle bracket is provided with a second mounting hole, an end of the first harmonic reducer where the output end is located passes through the second mounting hole, and a diaphragm of the right angle bracket is clamped and fixed between the first harmonic reducer and the first position-limiting plate.

2. The multi-degree-of-freedom driving arm of claim 1, wherein the second driving mechanism comprises a second motor bracket fixed in the first space, a second servo motor fixed on the second motor bracket, a second motor controller configured to drive the second servo motor, a third synchronous wheel driven by the rotating shaft of the second servo motor, a fourth synchronous wheel, a second harmonic reducer fixed coaxially with the fourth synchronous wheel, a second position-limiting plate, a second positioning plate and a second conduit fixing bracket through which the conduit passes; the third synchronous wheel is coupled to the fourth synchronous wheel via a second synchronous belt; a side surface of the triangular bracket is provided with a third mounting hole through which the rotating shaft of the fourth synchronous wheel passes, the rotating shaft of the fourth synchronous wheel is fixedly connected with the input end of the second harmonic reducer, an end of the second harmonic reducer where an input end is located is fixedly mounted on the side surface of the triangular bracket around the third mounting hole in the dual-degree-of-freedom driving module adjacent thereto, the second conduit fixing bracket is fixed on the center of the second positioning plate, the second position-limiting plate is fixed on the output end of the second harmonic reducer, the second conduit fixing bracket sequentially passes through a through hole in a center of the second position-limiting plate, the second harmonic reducer and the fourth bevel gear, and clamps the side surface of the triangular bracket between the second harmonic reducer and the second positioning plate.

3. The multi-degree-of-freedom driving arm of claim 2, wherein the side surface of the triangular bracket located between adjacent dual-degree-of-freedom driving modules is provided with a second casing configured to cover the second harmonic reducer.

4. The multi-degree-of-freedom driving arm of claim 2, wherein the single-degree-of-freedom driving module comprises a first mounting plate, a second mounting plate mounted perpendicularly to the first mounting plate, a third motor bracket disposed on the first mounting plate, a third servo motor fixed on the third motor bracket, a fifth synchronous wheel connected to the driving shaft of the third servo motor and driven by the third servo motor, a sixth synchronous wheel, a third harmonic reducer fixed coaxially with the sixth synchronous wheel, and a third position-limiting plate, a third positioning plate and a third conduit fixing bracket through which the conduit passes; the fifth synchronous wheel is coupled to the sixth synchronous wheel via a third synchronous belt; the rotating shaft of the six synchronous wheel is fixedly connected with an input end of the third harmonic reducer, and the second mounting plate is clamped between the sixth synchronous wheel and the third harmonic reducer, an end of the third harmonic reducer where an input end is located is fixedly mounted on the second mounting plate; the end of the third harmonic reducer where the input end is located is fixedly mounted on the side surface of the triangular bracket around the third mounting hole in the dual-degree-of-freedom driving module adjacent thereto; the third conduit fixing bracket is fixed on the center of the third positioning plate, the third position-limiting plate is fixed on an output end of the third harmonic reducer, and the third conduit fixing bracket sequentially passes through the side surface of the triangular bracket in the dual-degree-of-freedom driving module adjacent to the single-degree-of-freedom driving module, a through hole in a center of the third position-limiting plate, the third harmonic reducer and the sixth synchronous wheel, and clamps the side surface of the triangular bracket between the third harmonic reducer and the third positioning plate.

5. The multi-degree-of-freedom driving arm of claim 4, wherein the first position-limiting plate is cut out inward partially at its periphery to form a missing portion and a convex portion which are spaced apart from each other, the diaphragm at the periphery of the first harmonic reducer is provided with three first sensors that are distributed with intervals of 45 degrees, and when the first position-limiting plate rotates with the second bevel gear, the first sensor is aligned with the missing position or the convex position of the first position-limiting plate; the structures of the second position-limiting plate and the third position-limiting plate are consistent with the structure of the first position-limiting plate; the side surface of the triangular bracket on the periphery of the second harmonic reducer is provided with three second sensors that are distributed with intervals of 45 degrees, and when the second position-limiting plate rotates with the fourth synchronous wheel, the first sensor is aligned with a missing position or a convex position of the second position-limiting plate; the second mounting plate on the periphery of the third harmonic reducer is provided with three third sensors that are distributed with intervals of 45 degrees, and when the third position-limiting plate rotates with the sixth synchronous wheel, the third sensor is aligned with a missing position or a convex position of the third position-limiting plate.

6. The multi-degree-of-freedom driving arm of claim 5, wherein the dual-arm robot comprises a base, two sets of multi-degree-of-freedom driving arms disposed on the base, and a fixture disposed on an outer end of the multi-degree-of-freedom driving arm; each set of multi-degree-of-freedom driving arms comprises three dual-degree-of-freedom driving modules sequentially connected to each other from the inner side to the outer side, and the dual-degree-of-freedom driving module located on the inner side is connected with a single-degree-of-freedom driving module connected to the base, and the fixture is connected to the dual-degree-of-freedom driving module located on the outer side; all ends of the first servo motor are each provided with a relative encoder and a band brake that are configured to control the first sensor and the limiting information of the first position-limiting plate, and the dual-arm robot is provided with a processing module configured to receive and process the feedback information transmitted from the relative encoder; the relative encoder and the band brake used in the ends of the second servo motor and the third servo motor have the same structures as those used in the first servo motor.

7. The multi-degree-of-freedom driving arm of claim 2, comprising three dual-degree-of-freedom driving modules.

* * * * *